(12) United States Patent (10) Patent No.: US 12,574,966 B2
Lin (45) Date of Patent: Mar. 10, 2026

(54) METHOD AND APPARATUS FOR LISTEN-BEFORE-TALK MODE FOR RANDOM ACCESS RESPONSE IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei City (TW)

( * ) Notice: Subject to any disclaimer, the term of this patent is extended or adjusted under 35 U.S.C. 154(b) by 285 days.

(21) Appl. No.: 17/876,405

(22) Filed: Jul. 28, 2022

(65) Prior Publication Data

US 2023/0044448 A1 Feb. 9, 2023

Related U.S. Application Data

(60) Provisional application No. 63/227,748, filed on Jul. 30, 2021.

(51) Int. Cl.
| | |
|---|---|
| *H04W 74/0816* | (2024.01) |
| *H04W 16/14* | (2009.01) |
| *H04W 74/0833* | (2024.01) |
| *H04W 74/0838* | (2024.01) |

(52) U.S. Cl.
CPC ....... *H04W 74/0816* (2013.01); *H04W 16/14* (2013.01); *H04W 74/0833* (2013.01); *H04W 74/0841* (2013.01); *H04W 74/0838* (2024.01)

(58) Field of Classification Search
CPC ............. H04W 74/0816; H04W 16/14; H04W 74/0841; H04W 74/006; H04W 74/08; H04W 74/0808; H04W 74/0825; H04W 74/0833; H04W 74/0838; H04W 74/085
See application file for complete search history.

(56) References Cited

U.S. PATENT DOCUMENTS

| | | | | |
|---|---|---|---|---|
| 2020/0037361 A1* | 1/2020 | Chakraborty | ......... | H04W 72/23 |
| 2020/0059969 A1* | 2/2020 | Agiwal | ................. | H04W 72/23 |
| 2020/0229239 A1 | 7/2020 | Fan et al. | | |
| 2020/0413485 A1* | 12/2020 | Kundu | .............. | H04W 72/0446 |

(Continued)

FOREIGN PATENT DOCUMENTS

| | | |
|---|---|---|
| CN | 110392429 A | 10/2019 |
| CN | 112056000 A | 12/2020 |

(Continued)

OTHER PUBLICATIONS

3GPP, "Physical layer procedures for control (Release 16)", (Jun. 2021), 3GPP TS 38.213 V16.6.0, pp. 1-187 (Year: 2021).*

(Continued)

*Primary Examiner* — Paul H. Masur
(74) *Attorney, Agent, or Firm* — Skaar Ulbrich Macari, P.A.

(57) ABSTRACT

Methods, systems, and apparatuses are provided for listen-before-talk (LBT) mode for random access response (RAR) in a wireless communication system so that RAR indication of channel access type and cyclic prefix (CP) extension can be more efficient. A method of a User Equipment (UE) can comprise initiating a random access procedure, receiving a RAR, wherein the RAR comprises a channel access type indication, and determining whether to perform LBT for a Msg3 based on the channel access type indication in RAR.

22 Claims, 13 Drawing Sheets

(56) References Cited

U.S. PATENT DOCUMENTS

| | | | | |
|---|---|---|---|---|
| 2021/0127426 A1* | 4/2021 | Shi | ..................... | H04W 74/0833 |
| 2021/0194740 A1 | 6/2021 | Aldana et al. | | |
| 2021/0307010 A1 | 9/2021 | Abotabl et al. | | |
| 2022/0110168 A1* | 4/2022 | Talarico | ............ | H04W 74/0841 |
| 2022/0272749 A1* | 8/2022 | Zhang | ............... | H04W 74/0808 |
| 2023/0199862 A1* | 6/2023 | Li | ........................ | H04W 52/08 |
| | | | | 370/329 |

FOREIGN PATENT DOCUMENTS

| | | | |
|---|---|---|---|
| CN | 112438072 A | 3/2021 | |
| EP | 3955688 A1 | 2/2022 | |
| WO | 2021072723 A1 | 4/2021 | |
| WO | 2021109461 A1 | 6/2021 | |

OTHER PUBLICATIONS

3GPP, "Multiplexing and channel coding (Release 16)", (Jun. 2021), 3GPP TS 38.212 V16.6.0,, pp. 1-153 (Year: 2021).*

Merriam-Webster, Definition of "Whether", https://www.merriam-webster.com/dictionary/whether, pp. 1-5 (Year: 2025).*

State Intellectual Property Office of People's Republic of China, "Translation of First Office Action for Application No. or Publication No. 202210903784.3", May 20, 2025, pp. 1-10 (Year: 2025).*

State Intellectual Property Office of People's Republic of China, "Translation of Second Office Action for Application No. or Publication No. 202210903784.3", Sep. 25, 2025, pp. 1-13 (Year: 2025).*

"FL summary of channel access mechanism for 52.6GHz-71GHz band, ver01"; 3GPP TSG RAN WG1 Meeting #107e; R1-2112460; Qualcomm Incorporated; Nov. 11-Nov. 19, 2021; 72 pages.

"Summary of [102-e-NR-unlic-NRU-ChAcc-01] Email discussion/approval on XXXX"; 3GPP TSG RAN WG1 #102-e; R1-200XXX; Nokia; Aug. 17-Aug. 28, 2020; 37 pages.

Office Action to the corresponding Korean Patent Application rendered by the Korean Intellectual Property Office (KIPO) on Apr. 14, 2025, 18 pages (including English translation).

Office Action to the corresponding Chinese patent application rendered by the China National Intellectual Property Administration (CNIPA) on May 20, 2025, 11 pages.

Office Action to the corresponding Chinese patent application rendered by the China National Intellectual Property Administration (CNIPA) on Sep. 25, 2025, 11 pages.

* cited by examiner

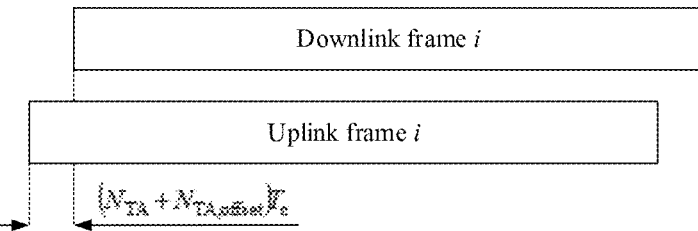

| Downlink frame *i* |
| --- |

| Uplink frame *i* |
| --- |

$$(N_{TA} + N_{TA,offset})T_c$$

FIG. 5 (Prior Art)

Table 4.2.1-1: Channel Access Priority Class (CAPC) for UL

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

NOTE1:  For $p = 3,4$, $T_{ulm\,cot,p} = 10ms$  if the higher layer parameter *absenceOfAnyOtherTechnology-r14* or *absenceOfAnyOtherTechnology-r16* is provided , otherwise, $T_{ulm\,cot,p} = 8ms$.

NOTE 2:  When $T_{ulm\,cot,p} = 8ms$  it may be increased to $8ms$  by inserting one or more gaps. The minimum duration of a gap shall be $100us$  The maximum duration before including any such gap shall be $8ms$.

Determining whether indication of channel access type and/or CP extension is present in the RAR at least based on a LBT mode of the UE

1012

1020

1022

Initiating a random access procedure

1024

Receiving a RAR, wherein the RAR comprises a channel access type indication

1026

Determining whether to perform LBT for a Msg3 based on the channel access type indication in the RAR

1030

Receiving a RAR, wherein the RAR comprises a channel access type indication          1032

Receiving a RAR, wherein the RAR comprises a channel access type indication          1034

Determining whether to perform LBT for a Msg3 based on its LBT mode irrespective of the channel access type indication in the RAR          1036

1070

Receiving or detecting a preamble received from a UE

1072

Transmitting a RAR to the UE, wherein the RAR comprises a channel access type field irrespective of whether LBT is performed or not

1074

METHOD AND APPARATUS FOR LISTEN-BEFORE-TALK MODE FOR RANDOM ACCESS RESPONSE IN A WIRELESS COMMUNICATION SYSTEM

CROSS-REFERENCE TO RELATED APPLICATIONS

The present application claims priority to and the benefit of U.S. Provisional Patent Application Ser. No. 63/227,748, filed Jul. 30, 2021, which is fully incorporated herein by reference.

FIELD

This disclosure generally relates to wireless communication networks and, more particularly, to a method and apparatus for listen-before-talk (LBT) mode for random access response in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for listen-before-talk (LBT) mode for random access response (RAR) in a wireless communication system so that RAR indication of channel access type and cyclic prefix (CP) extension can be more efficient.

In various embodiments, a method of a User Equipment (UE) can comprise initiating a random access procedure, receiving a RAR, wherein the RAR comprises a channel access type indication, and determining whether to perform LBT for a Msg3 based on the channel access type indication in RAR.

In various embodiments, a method of a UE can comprise initiating a random access procedure, receiving a RAR, wherein the RAR comprises a channel access type indication, and determining whether to perform LBT for a Msg3 based on a LBT mode of the UE irrespective of the channel access type indication in the RAR.

In various embodiments, a method of a base station can comprise receiving or detecting a preamble received from a UE, transmitting a RAR to the UE, wherein the RAR comprises a channel access type field irrespective of whether LBT is performed or not.

BRIEF DESCRIPTION OF THE DRAWINGS

FIG. 5 is a reproduction of Figure 4.3.1-1: Uplink-downlink timing relation from 3GPP TS 38.211 V15.7.0.

FIG. 6 is a reproduction of Table 4.2.1-1: Channel Access Priority Class (CAPC) for UL from Draft 3GPP TS 37.213 V16.4.0.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.211 V15.7.0, "NR physical channels and modulation"; [2] Draft 3GPP TS 37.213 V16.4.0, "NR Physical layer procedures for shared spectrum channel access"; [3] RP-202925, "Revised WID: Extending current NR operation to 71 GHz"; [4] 3GPP TS 38.213 V16.6.0, "NR Physical layer procedures for control"; and [5] 3GPP TS 38.212 V16.6.0, "NR Multiplexing and channel coding". The standards and documents listed above are hereby expressly and fully incorporated herein by reference in their entirety.

Figure 1:
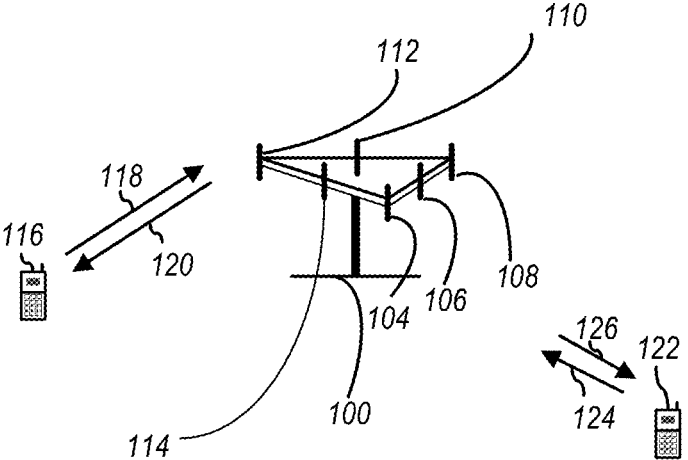
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
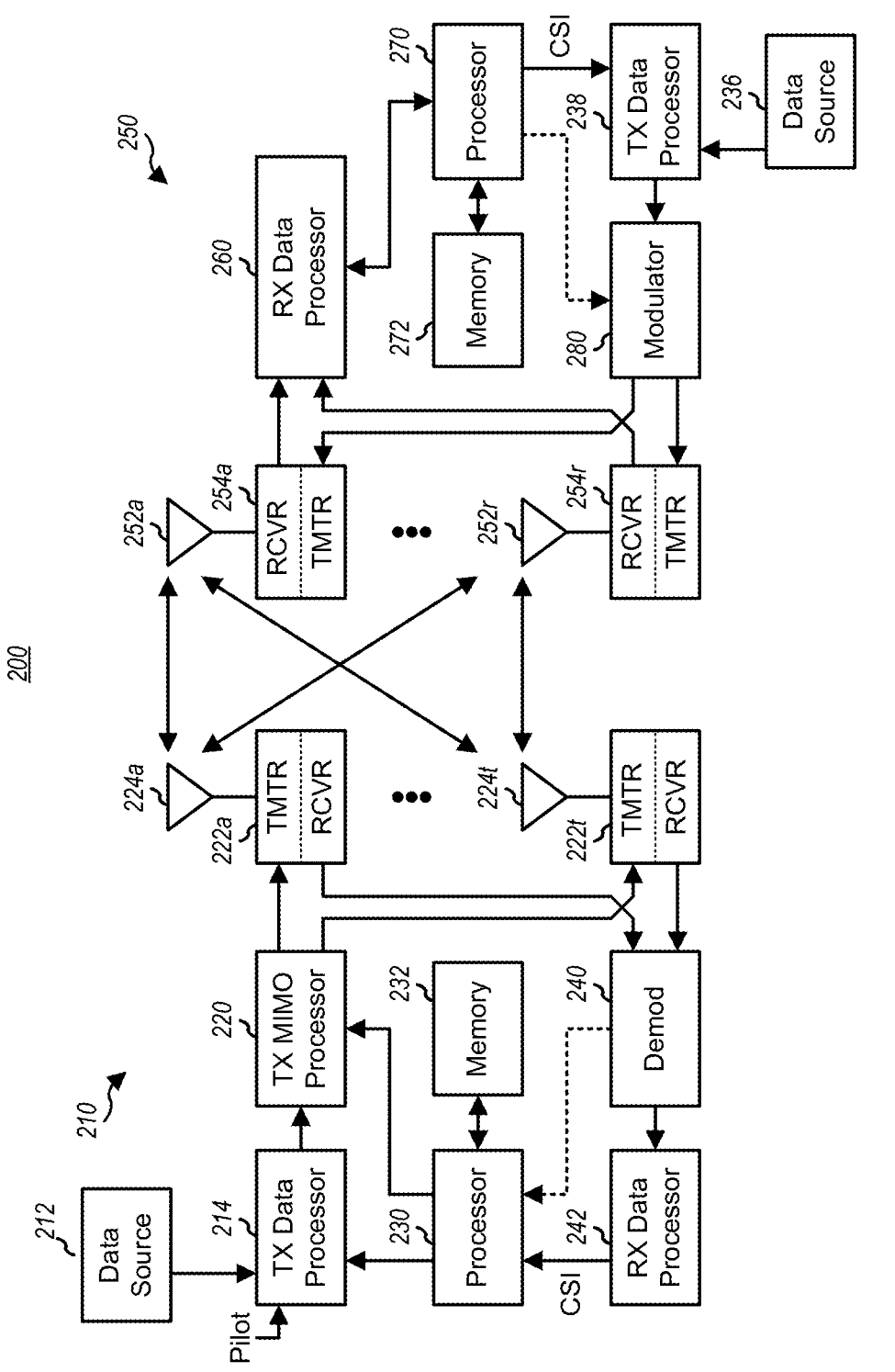
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
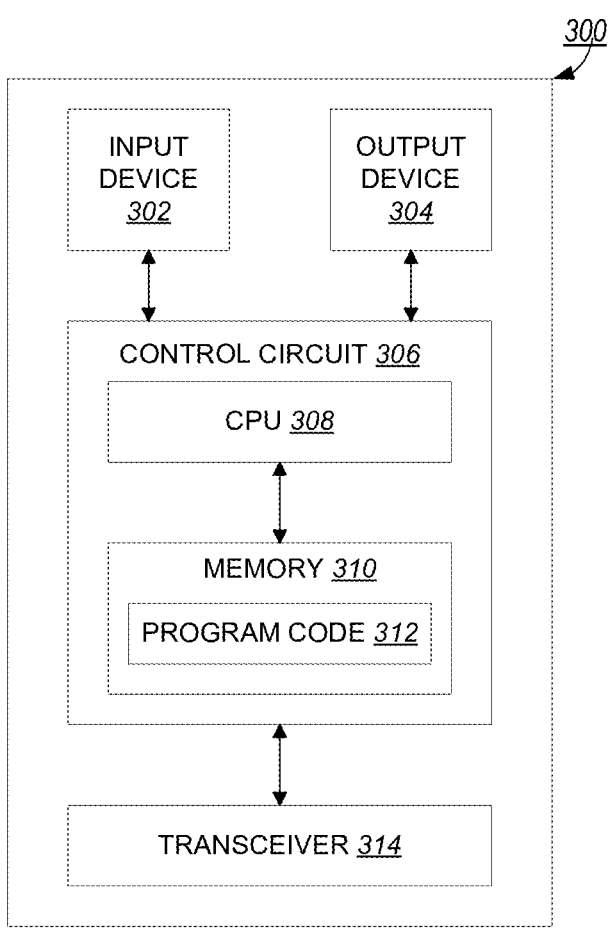
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
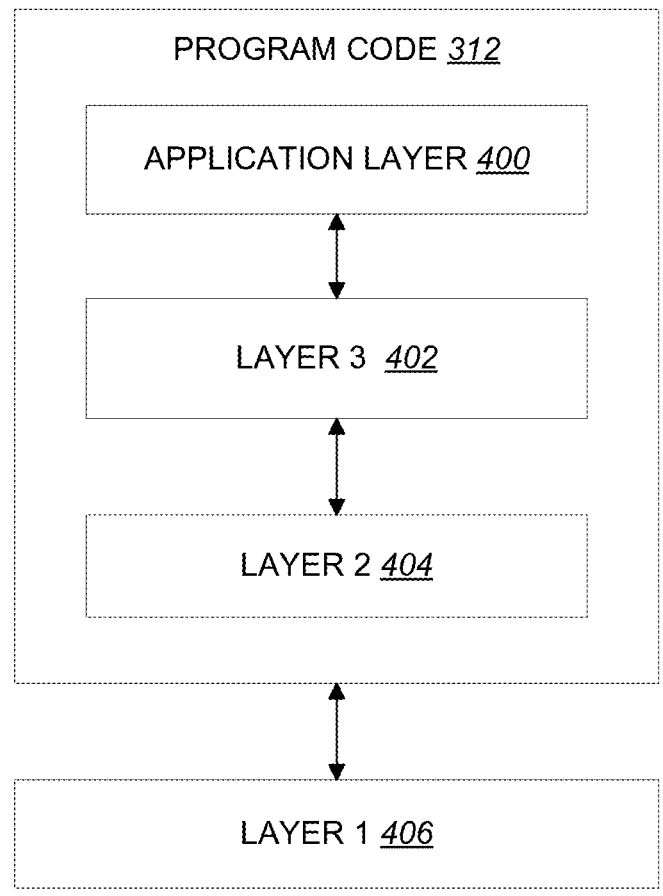
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

Frame structure used in New RAT (NR) for 5G, to accommodate various types of requirements (e.g., [1] 3GPP TS 38.211 V15.7.0) for time and frequency resources, e.g., from ultra-low latency (~0.5 ms) to delay-tolerant traffic for Massive Machine Type (MTC), from high peak rate for enhanced Mobile Broadband (eMBB) to very low data rate for MTC. An important focus of this study is low latency aspect, e.g., short Transmission Time Interval (TTI), while other aspects of mixing/adapting different TTIs can also be considered in the study. In addition to diverse services and requirements, forward compatibility is an important consideration in initial NR frame structure design as not all features of NR would be included in the beginning phase/release.

Reducing latency of protocol is an important improvement between different generations/releases, which can improve efficiency as well as meeting new application requirements, e.g., real-time service. An effective method frequently adopted to reduce latency is to reduce the length of TTIs, from 10 ms in 3G to 1 ms in LTE.

When it comes to NR, the story becomes somehow different, as backward compatibility is not a must. Numerology can be adjusted so that reducing symbol number of a TTI would not be the only tool to change TTI length. Using LTE numerology as an example, it comprises 14 Orthogonal Frequency Division Multiplexing (OFDM) symbol in 1 ms and a subcarrier spacing of 15 KHz. When the subcarrier spacing goes to 30 KHz, under the assumption of same Fast Fourier Transform (FFT) size and same CP structure, there would be 28 OFDM symbols in 1 ms, equivalently the TTI become 0.5 ms if the number of OFDM symbol in a TTI is kept the same. This implies the design between different TTI lengths can be kept common, with good scalability performed on the subcarrier spacing. Of course, there would always be trade-off for the subcarrier spacing selection, e.g., FFT size, definition/number of Physical Resource Block (PRB), the design of CP, supportable system bandwidth, etc. While as NR considers larger system bandwidth, and larger coherence bandwidth, inclusion of a larger sub carrier spacing is a nature choice.

More details of NR frame structure, channel and numerology design is given below from [1] 3GPP TS 38.211 V15.7.0:

Quotation Start

4 Frame Structure and Physical Resources
4.1 General
Throughout this specification, unless otherwise noted, the size of various fields in the time domain is expressed in time units $T_c = 1/(\Delta f_{max} \cdot N_f)$ where $\Delta f_{max} = 480 \cdot 10^3$ Hz and $N_f = 4096$. The constant $\kappa = T_s/T_c = 64$ where $T_s = 1/(\Delta f_{ref} \cdot N_{f,ref})$, $\Delta f_{ref} = 15 \cdot 10^3$ Hz and $N_{f,ref} = 2048$.
4.2 Numerologies
Multiple OFDM numerologies are supported as given by Table 4.2-1 where $\mu$ and the cyclic prefix for a bandwidth part are obtained from the higher-layer parameter subcarrierSpacing and cyclicPrefix, respectively.

TABLE 4.2-1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3 Frame Structure
4.3.1 Frames and Subframes
Downlink and uplink transmissions are organized into frames with $T_f = (\Delta f_{max} N_f/100) \cdot T_c = 10$ ms duration, each consisting of ten subframes of $T_{sf} = (\Delta f_{max} \cdot N_f/1000) \cdot T_c = 1$ ms duration. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TA,offset}$ is given by [5, TS 38.213].

FIG. 5 is a Reproduction of Figure 4.3.1-1: Uplink-Downlink Timing Relation from 3GPP TS 38.211 V15.7.0.

4.3.2 Slots

For subcarrier spacing configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N_{Rx-Tx}T_c$ after the end of the last received downlink symbol in the same or different cell within the group of cells where $N_{Rx-Tx}$ is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than $N_{Rx-Tx}T_c$ after the end of the last transmitted uplink symbol in the same or different cell within the group of cells where $N_{Rx-Tx}$ is given by Table 4.3.2-3.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Rx-Tx}T_c$ after the end of the last transmitted uplink symbol in the same cell where $N_{Rx-Tx}$ is given by Table 4.3.2-3.

TABLE 4.3.2-1

Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 4.3.2-1-continued

Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |

TABLE 4.3.2-2

Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

TABLE 4.3.2-3

Transition time $N_{Rx-Tx}$ and $N_{Tx-Rx}$

| Transition time | FR1 | FR2 |
|---|---|---|
| $N_{Tx-Rx}$ | 25600 | 13792 |
| $N_{Rx-Tx}$ | 25600 | 13792 |

4.4 Physical Resources 4.4.3 Resource Elements

Each element in the resource grid for antenna port p and subcarrier spacing configuration $\mu$ is called a resource element and is uniquely identified by $(k, l)_{p,\mu}$ where k is the index in the frequency domain and l refers to the symbol position in the time domain relative to some reference point. Resource element $(k, l)_{p,\mu}$ corresponds to a physical resource and the complex value $a_{k,l}^{(p,\mu)}$. When there is no risk for confusion, or no particular antenna port or subcarrier spacing is specified, the indices p and $\mu$ may be dropped, resulting in $a_{k,l}^{(p)}$ or $a_{k,l}$.

4.4.4 Resource Blocks 4.4.4.1 General

A resource block is defined as $N_{sc}^{RB}=12$ consecutive subcarriers in the frequency domain.

4.4.4.3 Common Resource Blocks

Common resource blocks are numbered from 0 and upwards in the frequency domain for subcarrier spacing configuration $\mu$. The center of subcarrier 0 of common resource block 0 for subcarrier spacing configuration $\mu$ coincides with 'point A'.

The relation between the common resource block number $n_{CRB}^\mu$ in the frequency domain and resource elements (k,l) for subcarrier spacing configuration $\mu$ is given by $$n_{CRB}^\mu = \left\lfloor \frac{k}{N_{sc}^{RB}} \right\rfloor$$

where k is defined relative to point A such that k=0 corresponds to the subcarrier centered around point A.

4.4.4.4 Physical Resource Blocks

Physical resource blocks for subcarrier configuration $\mu$ are defined within a bandwidth part and numbered from 0 to $N_{BWP,i}^{size,\mu}-1$ where i is the number of the bandwidth part.

The relation between the physical resource block $n_{PRB}^{\mu}$ in bandwidth part i and the common resource block $n_{CRB}^{\mu}$ is given by $$n_{CRB}^{\mu} = n_{PRB}^{\mu} + N_{BWP,i}^{start,\mu}$$

where $N_{BWP,i}^{start,\mu}$ is the common resource block where bandwidth part starts relative to common resource block 0. When there is no risk for confusion the index $\mu$ may be dropped.

4.4.4.5 Virtual Resource Blocks
Virtual resource blocks are defined within a bandwidth part and numbered from 0 to $N_{BWP,i}^{size}-1$ where i is the number of the bandwidth part.

4.4.5 Bandwidth Part
A bandwidth part is a subset of contiguous common resource blocks defined in subclause 4.4.4.3 for a given numerology $\mu_i$ in bandwidth part i on a given carrier. The starting position $N_{BWP,i}^{start,\mu}$ and the number of resource blocks $N_{BWP,i}^{size,\mu}$ in a bandwidth part shall fulfil $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index $\mu$ may be dropped from $N_{BWP,i}^{start,\mu}$, $N_{BWP,i}^{size,\mu}$, $N_{grid,x}^{start,\mu}$, and $N_{grid,x}^{size,\mu}$.

Quotation End

When accessing an unlicensed spectrum, e.g., a shared spectrum, some mechanism to determine whether a device, e.g., a UE or a base station/access node, could access the spectrum (e.g., perform a transmission) may be required to ensures fairness for all devices on the spectrum. For example, a device could detect/receive signal on the spectrum/serving cell to judge whether the spectrum is available for utilization. When a device detects nothing or silence, e.g., for certain period, the device could consider the spectrum available and perform transmission. On the other hand, when a device detects some signal, e.g., with certain strength from other device, on the spectrum, the device could consider the spectrum currently occupied and hold off its transmission. This kind of mechanism is known as listen-before-talk (LBT). There could be some more details regarding how LBT is done, such as a threshold for device to judge whether the channel is currently occupied or not (e.g., a device could consider a too weak signal as silence), how long the device perform detection and/or how to proceed the following when a device fails a trial of LBT, e.g., when and/or how to perform another trial of detection. More details of channel accessing scheme could be found in the following from [2] Draft 3GPP TS 37.213 V16.4.0:

Quotation Start

4 Channel Access Procedure
4.0 General
Unless otherwise noted, the definitions below are applicable for the following terminologies used in this specification:

A channel refers to a carrier or a part of a carrier consisting of a contiguous set of resource blocks (RBs) on which a channel access procedure is performed in shared spectrum.

A channel access procedure is a procedure based on sensing that evaluates the availability of a channel for performing transmissions. The basic unit for sensing is a sensing slot with a duration $T_{sl}=9$ us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

A channel occupancy refers to transmission(s) on channel(s) by eNB/gNB/UE(s) after performing the corresponding channel access procedures in this clause.

A Channel Occupancy Time refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25 us, the gap duration is counted in the channel occupancy time. A channel occupancy time can be shared for transmission between an eNB/gNB and the corresponding UE(s).

A DL transmission burst is defined as a set of transmissions from an eNB/gNB without any gaps greater than 16 us. Transmissions from an eNB/gNB separated by a gap of more than 16 us are considered as separate DL transmission bursts. An eNB/gNB can transmit transmission(s) after a gap within a DL transmission burst without sensing the corresponding channel(s) for availability.

A UL transmission burst is defined as a set of transmissions from a UE without any gaps greater than 16 us. Transmissions from a UE separated by a gap of more than 16 us are considered as separate UL transmission bursts. A UE can transmit transmission(s) after a gap within a UL transmission burst without sensing the corresponding channel(s) for availability.

A discovery burst refers to a DL transmission burst including a set of signal(s) and/or channel(s) confined within a window and associated with a duty cycle. The discovery burst can be any of the following:

Transmission(s) initiated by a gNB that includes at least an SS/PBCH block consisting of a primary synchronization signal (PSS), secondary synchronization signal (SSS), physical broadcast channel (PBCH) with associated demodulation reference signal (DM-RS) and may also include CORESET for PDCCH scheduling PDSCH with SIB1, and PDSCH carrying SIB1 and/or non-zero power CSI reference signals (CSI-RS).

4.1 Downlink Channel Access Procedures
An eNB operating LAA Scell(s) on channel(s) and a gNB performing transmission(s) on channel(s) shall perform the channel access procedures described in this clause for accessing the channel(s) on which the transmission(s) are performed.

In this clause, $X_{Thresh}$ for sensing is adjusted as described in clause 4.1.5 when applicable.

A gNB performs channel access procedures in this clause unless the higher layer parameter ChannelAccessMode-r16 is provided and ChannelAccessMode-r16='semistatic'.

4.1.1 Type 1 DL Channel Access Procedures

This clause describes channel access procedures to be performed by an eNB/gNB where the time duration spanned by the sensing slots that are sensed to be idle before a downlink transmission(s) is random. The clause is applicable to the following transmissions:

Transmission(s) initiated by a gNB including unicast PDSCH with user plane data, or unicast PDSCH with user plane data and unicast PDCCH scheduling user plane data, or Transmission(s) initiated by a gNB with only discovery burst or with discovery burst multiplexed with non-unicast information, where the transmission(s) duration is larger than 1 ms or the transmission causes the discovery burst duty cycle to exceed 1/20.

The eNB/gNB may transmit a transmission after first sensing the channel to be idle during the sensing slot durations of a defer duration $T_d$ and after the counter N is zero in step 4. The counter N is adjusted by sensing the channel for additional sensing slot duration(s) according to the steps below:

1) set $N=N_{init}$, where $N_{init}$ is a random number uniformly distributed between 0 and $CW_p$, and go to step 4;

2) if $N>0$ and the eNB/gNB chooses to decrement the counter, set $N=N-1$;

3) sense the channel for an additional sensing slot duration, and if the additional sensing slot duration is idle, go to step 4; else, go to step 5;

4) if $N=0$, stop; else, go to step 2.

5) sense the channel until either a busy sensing slot is detected within an additional defer duration $T_d$ or all the sensing slots of the additional defer duration $T_d$ are detected to be idle;

6) if the channel is sensed to be idle during all the sensing slot durations of the additional defer duration $T_d$, go to step 4; else, go to step 5;

4.1.2 Type 2 DL Channel Access Procedures

This clause describes channel access procedures to be performed by an eNB/gNB where the time duration spanned by sensing slots that are sensed to be idle before a downlink transmission(s) is deterministic.

Type 2A channel access procedures as described in clause 4.1.2.1 are applicable to the following transmission(s) performed by an eNB/gNB:

Transmission(s) initiated by an eNB including discovery burst and not including PDSCH where the transmission(s) duration is at most 1 ms, or Transmission(s) initiated by a gNB with only discovery burst or with discovery burst multiplexed with non-unicast information, where the transmission(s) duration is at most 1 ms, and the discovery burst duty cycle is at most 1/20, or Transmission(s) by an eNB/gNB following transmission(s) by a UE after a gap of 25 us in a shared channel occupancy as described in clause 4.1.3.

Type 2B or Type 2C DL channel access procedures as described in clause 4.1.2.2 and 4.1.2.3, respectively, are applicable to the transmission(s) performed by a gNB following transmission(s) by a UE after a gap of 16 us or up to 16 us, respectively, in a shared channel occupancy as described in clause 4.1.3.

4.1.2.1 Type 2A DL Channel Access Procedures

An eNB/gNB may transmit a DL transmission immediately after sensing the channel to be idle for at least a sensing interval $T_{short\_dl}=25$ us. $T_{short\_dl}$ consists of a duration $T_f=16$ us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

4.1.2.2 Type 2B DL Channel Access Procedures

A gNB may transmit a DL transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

4.1.2.3 Type 2C DL Channel Access Procedures

When a gNB follows the procedures in this clause for transmission of a DL transmission, the gNB does not sense the channel before transmission of the DL transmission. The duration of the corresponding DL transmission is at most 584 us.

4.2 Uplink Channel Access Procedures

A UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) shall perform the procedures described in this clause for the UE to access the channel(s) on which the transmission(s) are performed.

In this clause, transmissions from a UE are considered as separate UL transmissions, irrespective of having a gap between transmissions or not, and $X_{Thresh}$ for sensing is adjusted as described in clause 4.2.3 when applicable.

A UE performs channel access procedures in this clause unless the higher layer parameter ChannelAccessMode-r16 is provided and ChannelAccessMode-r16='semistatic'.

If a UE fails to access the channel(s) prior to an intended UL transmission to a gNB, Layer 1 notifies higher layers about the channel access failure.

4.2.1 Channel Access Procedures for Uplink Transmission(s)

A UE can access a channel on which UL transmission(s) are performed according to one of Type 1 or Type 2 UL channel access procedures. Type 1 channel access procedure is described in clause 4.2.1.1. Type 2 channel access procedure is described in clause 4.2.1.2.

If a UL grant scheduling a PUSCH transmission indicates Type 1 channel access procedures, the UE shall use Type 1 channel access procedures for transmitting transmissions including the PUSCH transmission unless stated otherwise in this clause.

A UE shall use Type 1 channel access procedures for transmitting transmissions including the autonomous or configured grant PUSCH transmission on configured UL resources unless stated otherwise in this clause.

If a UL grant scheduling a PUSCH transmission indicates Type 2 channel access procedures, the UE shall use Type 2 channel access procedures for transmitting transmissions including the PUSCH transmission unless stated otherwise in this clause.

A UE shall use Type 1 channel access procedures for transmitting SRS transmissions not including a PUSCH transmission. UL channel access priority class p=1 in Table 4.2.1-1 is used for SRS transmissions not including a PUSCH.

If a DL assignment triggering SRS but not scheduling a PUCCH transmission indicates Type 2 channel access procedures, the UE shall use Type 2 channel access procedures.

If a UE is scheduled by an eNB/gNB to transmit PUSCH and SRS in contiguous transmissions without any gaps in between, and if the UE cannot access the channel for PUSCH transmission, the UE shall attempt to make SRS transmission according to uplink channel access procedures specified for SRS transmission.

If a UE is scheduled by a gNB to transmit PUSCH and one or more SRSs by a single UL grant in non-contiguous transmissions, or a UE is scheduled by a gNB to transmit PUCCH and/or SRSs by a single DL assignment in non-contiguous transmissions, the UE shall use the channel access procedure indicated by the scheduling DCI for the first UL transmission scheduled by the scheduling DCI. If the channel is sensed by the UE to be continuously idle after the UE has stopped transmitting the first transmission, the UE may transmit further UL transmissions scheduled by the scheduling DCI using Type 2 channel access procedures or Type 2A UL channel access procedures without applying a CP extension if the further UL transmissions are within the gNB Channel Occupancy Time. Otherwise, if the channel sensed by the UE is not continuously idle after the UE has stopped transmitting the first UL transmission or the further UL transmissions are outside the gNB Channel Occupancy Time, the UE may transmit the further UL transmissions using Type 1 channel access procedure, without applying a CP extension.

A UE shall use Type 1 channel access procedures for PUCCH transmissions unless stated otherwise in this clause. If a DL grant determined according to Clause 9.2.3 in [7, TS38.213] or a random access response (RAR) message for successRAR scheduling a PUCCH transmission indicates Type 2 channel access procedures, the UE shall use Type 2 channel access procedures.

When a UE uses Type 1 channel access procedures for PUCCH transmissions or PUSCH only transmissions without UL-SCH, the UE shall use UL channel access priority class p=1 in Table 4.2.1-1.

A UE shall use Type 1 channel access procedure for PRACH transmissions and PUSCH transmissions without user plane data related to random access procedure that initiate a channel occupancy. In this case, UL channel access priority class p=1 in Table 4.2.1-1 is used for PRACH transmissions, and UL channel access priority class used for PUSCH transmissions is determined according to Clause 5.6.2 in [9].

When a UE uses Type 1 channel access procedures for PUSCH transmissions on configured resource, the UE determines the corresponding UL channel access priority p in Table 4.2.1-1 following the procedures described in Clause 5.6.2 in [9].

When a UE uses Type 1 channel access procedures for PUSCH transmissions with user plane data indicated by a UL grant or related to random access procedure where the corresponding UL channel access priority p is not indicated, the UE determines p in Table 4.2.1-1 following the same procedures as for PUSCH transmission on configured resources using Type 1 channel access procedures.

When a UE uses Type 2A, Type 2B, or Type 2C UL channel access procedures for PUSCH transmissions indicated by a UL grant or related to random access procedures where the corresponding UL channel access priority p is not indicated, the UE assumes that the channel access priority class p=4 is used by the gNB for the Channel Occupancy Time.

A UE shall not transmit on a channel for a Channel Occupancy Time that exceeds $T_{ulm\ cot,\ p}$ where the channel access procedure is performed based on the channel access priority class p associated with the UE transmissions, as given in Table 4.2.1-1.

The total Channel Occupancy Time of autonomous uplink transmission(s) obtained by the channel access procedure in this clause, including the following DL transmission if the UE sets 'COT sharing indication' in AUL-UCI to '1' in a subframe within the autonomous uplink transmission(s) as described in Clause 4.1.3, shall not exceed $T_{ulm\ cot,\ p}$, where $T_{ulm\ cot,p}$ is given in Table 4.2.1-1.

FIG. 6 is a Reproduction of Table 4.2.1-1: Channel Access Priority Class (CAPC) for UL from Draft 3GPP TS 37.213 V16.4.0.

4.2.1.0 Channel Access Procedures and UL Related Signaling 4.2.1.0.0 Channel Access Procedures Upon Detection of a Common DCI If a UE detects 'UL duration and offset' field in DCI Format 1C as described in clause 5.3.3.1.4 of [5], the following are applicable:

If the 'UL duration and offset' field indicates an 'UL offset' and an 'UL duration' d for subframe n, then the scheduled UE may use channel access procedures Type 2 for transmissions in subframes n+l+i where i=0, 1, . . . d−1, irrespective of the channel access Type signalled in the UL grant for those subframes, if the end of UE transmission occurs in or before subframe n+l+d−1.

If the 'UL duration and offset' field indicates an 'UL offset' l and an 'UL duration' d for subframe n and the 'COT sharing indication for AUL' field is set to '1', then a UE configured with autonomous UL may use channel access procedures Type 2 for autonomous UL transmissions assuming any priority class in subframes n+l+i where i=0, 1, . . . d−1, if the end of UE autonomous UL transmission occurs in or before subframe n+l+d−1 and the autonomous UL transmission between n+l and n+l+d−1 shall be contiguous.

If the 'UL duration and offset' field indicates an 'UL offset' l and an 'UL duration' d for subframe n and the 'COT sharing indication for AUL' field is set to '0', then a UE configured with autonomous UL shall not transmit autonomous UL in subframes n+l+i where i=0, 1, . . . d−1.

If a UE determines the duration in time domain and the location in frequency domain of a remaining channel occupancy initiated by the gNB from a DCI format 2_0 as described in clause 11.1.1 of [7], the following is applicable:

The UE may switch from Type 1 channel access procedures as described in clause 4.2.1.1 to Type 2A channel access procedures as described in clause 4.2.1.2.1 for its corresponding UL transmissions within the determined duration in time and location in frequency domain of the remaining channel occupancy. In this case, if the UL transmissions are PUSCH transmissions on configured resources, the UE may assume any priority class for the channel occupancy shared with the gNB.

4.2.1.0.1 Channel Access Procedures for Consecutive UL Transmission(s)

For contiguous UL transmission(s), the following are applicable:

If a UE is scheduled to transmit a set of UL transmissions including PUSCH using a UL grant, and if the UE cannot access the channel for a transmission in the set prior to the last transmission according to one of Type 1, Type 2, or Type 2A UL channel access procedures, the UE shall attempt to transmit the next transmission according to the channel access type indicated in the UL grant. Otherwise, if the UE cannot access the channel for a transmission in the set prior to the last transmission according to Type 2B UL channel access procedure, the UE shall attempt to transmit the next transmission according to Type 2A UL channel access procedure.

If a UE is scheduled by a gNB to transmit a set of UL transmissions including PUSCH or SRS symbol(s) using a UL grant, the UE shall not apply a CP extension for the remaining UL transmissions in the set after the first UL transmission after accessing the channel.

If a UE is scheduled to transmit a set of consecutive UL transmissions without gaps including PUSCH using one or more UL grant(s), PUCCH using one or more DL grant(s), or SRS with one or more DL grant(s) or UL grant(s) and the UE transmits one of the scheduled UL transmissions in the set after accessing the channel according to one of Type 1, Type 2, Type 2A, Type 2B or Type 2C UL channel access procedures, the UE may continue transmission of the remaining UL transmissions in the set, if any.

If a UE is configured to transmit a set of consecutive PUSCH or SRS transmissions on resources configured by the gNB, the time domain resource configuration defines multiple transmission occasions, and if the UE cannot access the channel according to Type 1 UL channel access procedure for transmitting in a transmission occasion prior to the last transmission occasion, the UE shall attempt to transmit in the next transmission occasion according to Type 1 UL channel access procedure. If the UE transmits in one of the multiple transmission occasions after accessing the channel according to Type 1 UL channel access procedure, the UE may continue transmission in the remaining transmission occasions in the set, wherein each transmission occasion starts at the starting symbol of a configured grant PUSCH within the duration of the COT.

If a UE is configured by the gNB to transmit a set of consecutive UL transmissions without gaps including PUSCH, periodic PUCCH, or periodic SRS and the UE transmits one of the configured UL transmissions in the set after accessing the channel according to Type 1 UL channel access procedures, the UE may continue transmission of the remaining UL transmissions in the set, if any.

A UE is not expected to be indicated with different channel access types for any consecutive UL transmissions without gaps in between the transmissions, except if Type 2B or Type 2C UL channel access procedures are identified for the first of the consecutive UL transmissions.

For UL transmission(s) with multiple starting positions scheduled by eNB, the following are applicable:

If a UE is scheduled by an eNB to transmit transmissions including PUSCH Mode 1 using the Type 1 channel access procedure indicated in DCI, and if the UE cannot access the channel for a transmission according to the PUSCH starting position indicated in the DCI, the UE shall attempt to make a transmission at symbol 7 in the same subframe according to Type 1 channel access procedure. There is no limit on the number of attempts the UE can make using Type 1 channel access procedure.

If a UE is scheduled by an eNB to transmit transmissions including PUSCH Mode 1 using the Type 2 channel access procedure indicated in DCI, and if the UE cannot access the channel for a transmission according to the PUSCH starting position indicated in the DCI, the UE may attempt to make a transmission at symbol 7 in the same subframe and according to Type 2 channel access procedure. The number of attempts the UE should make within the consecutively scheduled subframes including the transmission is limited to w+1, where W is the number of consecutively scheduled subframes using Type 2 channel access procedure.

For contiguous UL transmissions(s) including a transmission pause, the following are applicable:

If a UE is scheduled to transmit a set of consecutive UL transmissions without gaps using one or more UL grant(s), and if the UE has stopped transmitting during or before one of these UL transmissions in the set and prior to the last UL transmission in the set, and if the channel is sensed by the UE to be continuously idle after the UE has stopped transmitting, the UE may transmit a later UL transmission in the set using Type 2 channel access procedures or Type 2A UL channel access procedures without applying a CP extension.

If a channel sensed by a UE is not continuously idle after the UE has stopped transmitting, the UE may transmit a later UL transmission in the set using Type 1 channel access procedure with the UL channel access priority class indicated in the DCI corresponding to the UL transmission.

For UL transmission(s) following autonomous UL transmission(s), the following are applicable:

If a UE is scheduled by an eNB to transmit on channel $c_i$ by a UL grant received on channel $c_j$, i≠j, and if the UE is transmitting using autonomous UL on channel $c_i$, the UE shall terminate the ongoing PUSCH transmissions using the autonomous UL at least one subframe before the UL transmission according to the received UL grant.

If a UE is scheduled by a UL grant received from an eNB on a channel to transmit a PUSCH transmission(s) starting from subframe n on the same channel using Type 1 channel access procedure and if at least for the first scheduled subframe occupies $N_{RB}^{UL}$ resource blocks and the indicated PUSCH starting position is OFDM symbol zero, and if the UE starts autonomous UL transmissions before subframe n using Type 1 channel access procedure on the same channel, the UE may transmit UL transmission(s) according to the received UL grant from subframe n without a gap, if the priority class value of the performed channel access procedure is larger than or equal to priority class value indicated in the UL grant, and the autonomous UL transmission in the subframe preceding subframe n shall end at the last OFDM symbol of the subframe regardless of the higher layer parameter endingSymbolAUL. The sum of the lengths of the autonomous UL transmission(s) and the scheduled UL transmission(s) shall not exceed the maximum channel occupancy time corresponding to the priority class value used to perform the autonomous uplink channel access procedure. Otherwise, the UE shall terminate the ongoing autonomous UL transmission at least one subframe before the start of the UL transmission according to the received UL grant on the same channel.

For UL transmission(s) following configured grant UL transmission(s), the following are applicable:

If a UE is scheduled to transmit UL transmission(s) starting from symbol i in slot n using Type 1 channel access procedures without CP extension with a corresponding CAPC, and if the UE starts configured grant UL transmissions before symbol i in slot n using Type 1 channel access procedures with a corresponding CAPC, and the scheduled UL transmission(s) occupies all the RBs of the same channels occupied by the configured grant UL transmission(s) or all the RBs of a subset thereof, the UE may directly continue to transmit the scheduled UL transmission(s) to the corresponding CAPC from symbol i in slot n without a gap, if the CAPC value of the performed channel access procedure is larger than or equal to the CAPC value corresponding to the scheduled UL transmission(s). The sum of the transmission durations of the configured grant UL transmission(s) and the scheduled UL transmission(s) shall not exceed the MCOT duration corresponding to the CAPC value used to transmit the configured grant UL transmission(s). Otherwise, the UE shall terminate the configured grant UL transmission(s) by dropping the transmission on the symbols of at least the last configured grant UL transmission before symbol i in slot n and attempt to transmit the scheduled UL transmission(s) according to the corresponding CAPC. The symbols of the PUSCH transmission with a configured grant in a slot is dropped according to the mechanism in Clause 11.1 of [7, TS 38.213] relative to a last symbol of a CORESET where the UE detected the scheduling DCI. In this case, if the UE cannot terminate the configured grant UL transmission(s), the UE ignores the scheduling DCI.

4.2.1.0.2 Conditions for Maintaining Type 1 UL Channel Access Procedures

If a UE receives a DCI indicating a UL grant scheduling a PUSCH transmission using Type 1 channel access procedures or indicating a DL assignment scheduling a PUCCH transmission using Type 1 channel access procedures, and if the UE has an ongoing Type 1 channel access procedures before the PUSCH or PUCCH transmission starting time:

If the UL channel access priority class value $p_1$ used for the ongoing Type 1 channel access procedures is same or larger than the UL channel access priority class value $p_2$ indicated in the DCI, the UE may transmit the PUSCH transmission in response to the UL grant by accessing the channel by using the ongoing Type 1 channel access procedure.

If the UL channel access priority class value $p_1$ used for the ongoing Type 1 channel access procedure is smaller than the UL channel access priority class value $p_2$ indicated in the DCI, the UE shall terminate the ongoing channel access procedure.

The UE may transmit the PUCCH transmission in response to the DL grant by accessing the channel by using the ongoing Type 1 channel access procedures.

4.2.1.0.3 Conditions for Indicating Type 2 Channel Access Procedures

An eNB/gNB may indicate Type 2 channel access procedures in the DCI of a UL grant or DL assignment scheduling transmission(s) including PUSCH or PUCCH on a channel, respectively, as follows:

If the UL transmissions occur within the time interval starting at $t_0$ and ending at $t_0+T_{CO}$, where $$T_{CO}=T_{m\ cot,p}+T_g,$$

$t_0$ is the time instant when the eNB/gNB has started transmission on the carrier according to the channel access procedure described in clause 4.1.1, $T_{m\ cot,p}$ value is determined by the eNB/gNB as described in clause 4.1.1, $T_g$ is the total duration of all gaps of duration greater than 25 us that occur between the DL transmission of the eNB/gNB and UL transmissions scheduled by the eNB/gNB, and between any two UL transmissions scheduled by the eNB/gNB starting from $t_0$, then, the eNB/gNB may indicate Type 2 channel access procedures in the DCI if the eNB/gNB has transmitted on the channel according to the channel access procedures described in clause 4.1.1, or the eNB may indicate using the 'UL duration and offset' field that the UE may perform a Type 2 channel access procedure for transmissions(s) including PUSCH on a channel in a subframe n when the eNB has transmitted on the channel according to the channel access procedure described in clause 4.1.1, or the eNB may indicate using the 'UL duration and offset' field and 'COT sharing indication for AUL' field that a UE configured with autonomous UL may perform a Type 2 channel access procedure for autonomous UL transmissions(s) including PUSCH on a channel in subframe n when the eNB has transmitted on the channel according to the channel access procedure described in clause 4.1.1 and acquired the channel using the largest priority class value and the eNB transmission includes PDSCH, or the eNB/gNB may schedule UL transmissions on a channel, that follow a transmission by the eNB/gNB on that channel with Type 2A channel access procedures for the UL transmissions as described in clause 4.2.1.2.1 after a duration of 25 us.

The eNB/gNB shall schedule UL transmissions between $t_0$ and $t_0+T_{CO}$ without gaps between consecutive UL transmissions if they can be scheduled contiguously. For a UL transmission on a channel that follows a transmission by the eNB/gNB on that channel using Type 2A channel access procedures as described in clause 4.2.1.2.1, the UE may use Type 2A channel access procedure for the UL transmission. If the eNB/gNB indicates Type 2 channel access procedure for the UE in the DCI, the eNB/gNB indicates the channel access priority class used to obtain access to the channel in the DCI.

For indicating a Type 2 channel access procedure, if the gap is at least 25 us, or equal to 16 us, or up to 16 us, the gNB may indicate Type 2A, or Type 2B, or Type 2C UL channel procedures, respectively, as described in clauses 4.2.1.2.

4.2.1.0.4 Channel Access Procedures for UL Multi-Channel Transmission(s)

If a UE is scheduled to transmit on a set of channels C, and if Type 1 channel access procedure is indicated by the UL scheduling grants for the UL transmissions on the set of channels C, and if the UL transmissions are scheduled to start transmissions at the same time on all channels in the set of channels C, or intends to perform an uplink transmission on configured resources on the set of channels C with Type 1 channel access procedure, and if UL transmissions are configured to start transmissions on the same time all channels in the set of channels C, and if the channel frequencies of set of channels C is a subset of one of the sets of channel frequencies defined in clause 5.7.4 in [2]

the UE may transmit on channel $c_i \in C$ using Type 2 channel access procedure as described in clause 4.2.1.2, if Type 2 channel access procedure is performed on channel $c_i$ immediately before the UE transmission on channel $c_j \in C$, i≠j, and if the UE has accessed channel $c_j$ using Type 1 channel access procedure as described in clause 4.2.1.1, where channel $c_j$ is selected by the UE uniformly randomly from the set of channels C before performing Type 1 channel access procedure on any channel in the set of channels C.

the UE may not transmit on channel $c_i \in C$ within the bandwidth of a carrier, if the UE fails to access any of the channels, of the carrier bandwidth, on which the UE is scheduled or configured by UL resources.

4.2.1.1 Type 1 UL Channel Access Procedure

This clause describes channel access procedures by a UE where the time duration spanned by the sensing slots that are sensed to be idle before a UL transmission(s) is random. The clause is applicable to the following transmissions:

PUSCH/SRS transmission(s) scheduled or configured by eNB/gNB, or

PUCCH transmission(s) scheduled or configured by gNB, or

Transmission(s) related to random access procedure.

A UE may transmit the transmission using Type 1 channel access procedure after first sensing the channel to be idle during the slot durations of a defer duration $T_d$, and after the counter N is zero in step 4. The counter N is adjusted by sensing the channel for additional slot duration(s) according to the steps described below.

1) set $N=N_{init}$, where $N_{init}$ is a random number uniformly distributed between 0 and $CW_p$, and go to step 4;

2) if N>0 and the UE chooses to decrement the counter, set N=N−1;

3) sense the channel for an additional slot duration, and if the additional slot duration is idle, go to step 4; else, go to step 5;

4) if N=0, stop; else, go to step 2.

5) sense the channel until either a busy slot is detected within an additional defer duration $T_d$ or all the slots of the additional defer duration $T_d$ are detected to be idle;

6) if the channel is sensed to be idle during all the slot durations of the additional defer duration $T_d$, go to step 4; else, go to step 5;

If a UE has not transmitted a UL transmission on a channel on which UL transmission(s) are performed after step 4 in the procedure above, the UE may transmit a transmission on the channel, if the channel is sensed to be idle at least in a sensing slot duration $T_{sl}$ when the UE is ready to transmit the transmission and if the channel has been sensed to be idle during all the slot durations of a defer duration $T_d$ immediately before the transmission. If the channel has not been sensed to be idle in a sensing slot duration $T_{sl}$ when the UE first senses the channel after it is ready to transmit, or if the channel has not been sensed to be idle during any of the sensing slot durations of a defer duration $T_d$ immediately before the intended transmission, the UE proceeds to step 1 after sensing the channel to be idle during the slot durations of a defer duration $T_d$.

The defer duration $T_d$ consists of duration $T_f=16$ us immediately followed by my consecutive slot durations where each slot duration is $T_{sl}=9$ us, and $T_f$ includes an idle slot duration $T_{sl}$ at start of $T_f$.

$CW_{min,\ p} \le CW_p \le CW_{max,\ p}$ is the contention window. $CW_p$ adjustment is described in clause 4.2.2.

$CW_{min,\ p}$ and $CW_{max,\ p}$ are chosen before step 1 of the procedure above.

$m_p$, $CW_{min,\ p}$, and $CW_{max,\ p}$ are based on a channel access priority class p as shown in Table 4.2.1-1, that is signalled to the UE.

4.2.1.2 Type 2 UL Channel Access Procedure

This clause describes channel access procedures by UE where the time duration spanned by the sensing slots that are sensed to be idle before a UL transmission(s) is deterministic.

If a UE is indicated by an eNB to perform Type 2 UL channel access procedures, the UE follows the procedures described in clause 4.2.1.2.1.

4.2.1.2.1 Type 2A UL Channel Access Procedure

If a UE is indicated to perform Type 2A UL channel access procedures, the UE uses Type 2A UL channel access procedures for a UL transmission. The UE may transmit the transmission immediately after sensing the channel to be idle for at least a sensing interval $T_{short\_ul}=25$ us. $T_{short\_ul}$ consists of a duration $T_f=16$ us immediately followed by one slot sensing slot and $T_f$ includes a sensing slot at start of $T_f$. The channel is considered to be idle for $T_{short\_ul}$ if both sensing slots of $T_{short\_ul}$. are sensed to be idle.

4.2.1.2.2 Type 2B UL Channel Access Procedure

If a UE is indicated to perform Type 2B UL channel access procedures, the UE uses Type 2B UL channel access procedure for a UL transmission. The UE may transmit the transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for total of at least 5 us with at least 4 us of sensing occurring in the sensing slot.

4.2.1.2.3 Type 2C UL Channel Access Procedure

If a UE is indicated to perform Type 2C UL channel access procedures for a UL transmission, the UE does not sense the channel before the transmission. The duration of the corresponding UL transmission is at most 584 us.

4.3 Channel Access Procedures for Semi-Static Channel Occupancy

Channel assess procedures based on semi-static channel occupancy as described in this Clause, are intended for environments where the absence of other technologies is guaranteed e.g., by level of regulations, private premises policies, etc. If a gNB provides UE(s) with higher layer parameters ChannelAccessMode-r16='semistatic' by SIB1 or dedicated configuration, a periodic channel occupancy can be initiated by the gNB every $T_x$ within every two consecutive radio frames, starting from the even indexed radio frame at $i \cdot T_x$ with a maximum channel occupancy time $T_y=0.95T_x$, where $T_x$=period in ms, is a higher layer parameter provided in SemiStaticChannelAccessConfig and $$i \in \left\{ 0, 1, \dots, \frac{20}{T_x} - 1 \right\}.$$

In the following procedures in this clause, when a gNB or UE performs sensing for evaluating a channel availability, the sensing is performed at least during a sensing slot duration $T_{sl}=9$ us. The corresponding $X_{Thresh}$ adjustment for performing sensing by a gNB or a UE is described in clauses 4.1.5 and 4.2.3, respectively.

A channel occupancy initiated by a gNB and shared with UE(s) shall satisfy the following:

The gNB shall transmit a DL transmission burst starting at the beginning of the channel occupancy time immediately after sensing the channel to be idle for at least a sensing slot duration $T_{sl}=9$ us. If the channel is sensed to be busy, the gNB shall not perform any transmission during the current period.

The gNB may transmit a DL transmission burst(s) within the channel occupancy time immediately after sensing the channel to be idle for at least a sensing slot duration $T_{sl}=9$ us if the gap between the DL transmission burst(s) and any previous transmission burst is more than 16 us.

The gNB may transmit DL transmission burst(s) after UL transmission burst(s) within the channel occupancy time without sensing the channel if the gap between the DL and UL transmission bursts is at most 16 us.

A UE may transmit UL transmission burst(s) after detection of a DL transmission burst(s) within the channel occupancy time as follows:

If the gap between the UL and DL transmission bursts is at most 16 us, the UE may transmit UL transmission burst(s) after a DL transmission burst(s) within the channel occupancy time without sensing the channel.

If the gap between the UL and DL transmission bursts is more than 16 us, the UE may transmit UL transmission burst(s) after a DL transmission burst(s) within the channel occupancy time after sensing the channel to be idle for at least a sensing slot duration $T_{sl}=9$ us within a 25 us interval ending immediately before transmission.

The gNB and UEs shall not transmit any transmissions in a set of consecutive symbols for a duration of at least $T_z=\max(0.05T_x, 100$ us) before the start of the next period.

If a UE fails to access the channel(s) prior to an intended UL transmission to a gNB, Layer 1 notifies higher layers about the channel access failure.

Quotation End

There is a study of operation in frequency band higher than 52.6 GHz. Some amendments are under consideration as there are several different characteristics which is different from the lower conventional frequency band, e.g., wider available bandwidth/larger (phase) noise/ICI. Therefore, it is expected that a larger subcarrier spacing, e.g., up to 960 kHz, and a bandwidth of a cell would be increased to GHz level, e.g., 1 or 2 GHz. Also since there are unlicensed spectrum in the considered frequency band, it is also under discussion whether there is any change required for channel accessing scheme. For example, there could be some cases a device could access the channel/spectrum without LBT, e.g., No-LBT. Also, there are some adjustments on LBT considered, such as directional LBT or receiver assistant LBT, as quoted in [3] RP-202925 below:

Quotation Start

According to the outcome of the study item on Supporting NR above 52.6 GHz and leveraging FR2 design to the extent possible, this WI extends NR operation up to 71 GHz considering, both, licensed and unlicensed operation, with the following objectives:

Physical layer aspects including [RAN1]:

In addition to 120 kHz SCS, specify new SCS, 480 kHz and 960 kHz, and define maximum bandwidth(s), for operation in this frequency range for data and control channels and reference signals, only NCP supported.

Note: Except for timing line related aspects, a common design framework shall be adopted for 480 kHz to 960 kHz Time line related aspects adapted to 480 kHz and 960 kHz, e.g., BWP and beam switching timing, HARQ timing, UE processing, preparation and computation timelines for PDSCH, PUSCH/SRS and CSI, respectively.

Support of up to 64 SSB beams for licensed and unlicensed operation in this frequency range.

Supports 120 kHz SCS for SSB and 120 kHz SCS for initial access related signals/channels in an initial BWP.

Study and specify, if needed, additional SCS (240 kHz, 480 kHz, 960 kHz) for SSB, and additional SCS (480 kHz, 960 kHz) for initial access related signals/channels in initial BWP.

Study and specify, if needed, additional SCS (480 kHz, 960 kHz) for SSB for cases other than initial access.

Note: coverage enhancement for SSB is not pursued.

Specify timing associated with beam-based operation to new SCS (i.e., 480 kHz and/or 960 kHz), study, and specify if needed, potential enhancement for shared spectrum operation Study which beam management will be used as a basis: R15/16 or R17 in RAN #91-e Support enhancement for PUCCH format 0/1/4 to increase the number of RBs under PSD limitation in shared spectrum operation.

Support enhancements for multi-PDSCH/PUSCH scheduling and HARQ support with a single DCI Note: coverage enhancement for multi-PDSCH/PUSCH scheduling is not pursued Support enhancement to PDCCH monitoring, including blind detection/CCE budget, and multi-slot span monitoring, potential limitation to UE PDCCH configuration and capability related to PDCCH monitoring.

Specify support for PRACH sequence lengths (i.e. L=139, L=571 and L=1151) and study, if needed, specify support for RO configuration for non-consecutive RACH occasions (RO) in time domain for operation in shared spectrum Evaluate, and if needed, specify the PTRS enhancement for 120 kHz SCS, 480 kHz SCS and/or 960 kHz SCS, as well as DMRS enhancement for 480 kHz SCS and/or 960 kHz SCS.

Physical layer procedure(s) including [RAN1]:

Channel access mechanism assuming beam based operation in order to comply with the regulatory requirements applicable to unlicensed spectrum for frequencies between 52.6 GHz and 71 GHz.

Specify both LBT and No-LBT related procedures, and for No-LBT case no additional sensing mechanism is specified.

Study, and if needed specify, omni-directional LBT, directional LBT and receiver assistance in channel access Study, and if needed specify, energy detection threshold enhancement

Quotation End

A random access procedure could be triggered due to various purposes. For example, random access procedure could be used to acquired UL transmission timing (e.g., for achieving UL synchronization or obtaining UL timing advance), and/or to request UL grant, and/or for purpose of handover and/or to establish Radio Resource Control (RRC) connection and/or to resume RRC connection and/or to reestablish RRC connection and/or to recover beam. There could be 4-step random access procedure and 2-step random access procedure. Several messages could be exchanged between UE and base station, such as Msg1 (preamble), Msg2 (RAR), Msg3 and/or, Msg 4 for 4-step random access procedure. Msg A and Msg B are involved. More details of random access procedure is quoted below from [4] 3GPP TS 38.213 V16.6.0 and [5] 3GPP TS 38.212 V16.6.0:

Quotation Start

8 Random Access Procedure

Prior to initiation of the physical random access procedure, Layer 1 receives from higher layers a set of SS/PBCH block indexes and provides to higher layers a corresponding set of RSRP measurements.

Prior to initiation of the physical random access procedure, Layer 1 may receive from higher layers an indication to perform a Type-1 random access procedure, as described in clauses 8.1 through 8.4, or a Type-2 random access procedure as described in clauses 8.1 through 8.2A.

Prior to initiation of the physical random access procedure, Layer 1 receives the following information from the higher layers:

Configuration of physical random access channel (PRACH) transmission parameters (PRACH preamble format, time resources, and frequency resources for PRACH transmission).

Parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the Type-1 L1 random access procedure includes the transmission of random access preamble (Msg1) in a PRACH, random access response (RAR) message with a PDCCH/PDSCH (Msg2), and when applicable, the transmission of a PUSCH scheduled by a RAR UL grant, and PDSCH for contention resolution.

From the physical layer perspective, the Type-2 L1 random access procedure includes the transmission of random access preamble in a PRACH and of a PUSCH (MsgA) and the reception of a RAR message with a PDCCH/PDSCH (MsgB), and when applicable, the transmission of a PUSCH scheduled by a fallback RAR UL grant, and PDSCH for contention resolution.

If a random access procedure is initiated by a PDCCH order to the UE, a PRACH transmission is with a same SCS as a PRACH transmission initiated by higher layers.

If a UE is configured with two UL carriers for a serving cell and the UE detects a PDCCH order, the UE uses the UL/SUL indicator field value from the detected PDCCH order to determine the UL carrier for the corresponding PRACH transmission.

8.1 Random Access Preamble

Physical random access procedure is triggered upon request of a PRACH transmission by higher layers or by a PDCCH order. A configuration by higher layers for a PRACH transmission includes the following:

A configuration for PRACH transmission [4, TS 38.211].

A preamble index, a preamble SCS, $P_{PRACH,target}$, a corresponding RA-RNTI, and a PRACH resource.

A PRACH is transmitted using the selected PRACH format with transmission power $P_{PRACH,b,f,c}(i)$, as described in clause 7.4, on the indicated PRACH resource.

For Type-1 random access procedure, a UE is provided a number N of SS/PBCH block indexes associated with one PRACH occasion and a number R of contention based preambles per SS/PBCH block index per valid PRACH occasion by ssb-perRACH-OccasionAndCB-Preambles-PerSSB.

For Type-2 random access procedure with common configuration of PRACH occasions with Type-1 random access procedure, a UE is provided a number N of SS/PBCH block indexes associated with one PRACH occasion by ssb-perRACH-OccasionAndCB-PreamblesPerSSB and a number Q of contention based preambles per SS/PBCH block index per valid PRACH occasion by msgA-CB-Preambles-PerSSB-PerSharedRO. The PRACH transmission can be on a subset of PRACH occasions associated with a same SS/PBCH block index within an SSB-RO mapping cycle for a UE provided with a PRACH mask index by msgA-SSB-SharedRO-MaskIndex according to [11, TS 38.321].

For Type-2 random access procedure with separate configuration of PRACH occasions with Type-1 random access procedure, a UE is provided a number N of SS/PBCH block indexes associated with one PRACH occasion and a number R of contention based preambles per SS/PBCH block index per valid PRACH occasion by msgA-SSB-PerRACH-Occa-sionAndCB-PreamblesPerSSB when provided; otherwise, by ssb-perRACH-OccasionAndCB-PreamblesPerSSB.

For Type-1 random access procedure, or for Type-2 random access procedure with separate configuration of PRACH occasions from Type 1 random access procedure, if N<1, one SS/PBCH block index is mapped to 1/N consecutive valid PRACH occasions and R contention based preambles with consecutive indexes associated with the SS/PBCH block index per valid PRACH occasion start from preamble index 0. If N≥1, R contention based preambles with consecutive indexes associated with SS/PBCH block index n, $0 \le n \le N-1$, per valid PRACH occasion start from preamble index $n \cdot N_{preamble}{}^{total}/N$ where $N_{preamble}{}^{total}$ is provided by totalNumberOfRA-Preambles for Type-1 random access procedure, or by msgA-TotalNumberOfRA-Preambles for Type-2 random access procedure with separate configuration of PRACH occasions from a Type 1 random access procedure, and is an integer multiple of N.

For Type-2 random access procedure with common configuration of PRACH occasions with Type-1 random access procedure, if N<1, one SS/PBCH block index is mapped to 1/N consecutive valid PRACH occasions and Q contention based preambles with consecutive indexes associated with the SS/PBCH block index per valid PRACH occasion start from preamble index R. If N≥1, Q contention based preambles with consecutive indexes associated with SS/PBCH block index n, $0 \le n \le N-1$, per valid PRACH occasion start from preamble index $n \cdot N_{preamble}{}^{total}/N+R$, where $N_{preamble}{}^{total}$ is provided by totalNumberOfRA-Preambles for Type-1 random access procedure.

For link recovery, a UE is provided N SS/PBCH block indexes associated with one PRACH occasion by ssb-perRACH-Occasion in BeamFailureRecoveryConfig. For a dedicated RACH configuration provided by RACH-Con-figDedicated, if cfra is provided, a UE is provided N SS/PBCH block indexes associated with one PRACH occasion by ssb-perRACH-Occasion in occasions. If N<1, one SS/PBCH block index is mapped to 1/N consecutive valid PRACH occasions. If N≥1, all consecutive N SS/PBCH block indexes are associated with one PRACH occasion.

SS/PBCH block indexes provided by ssb-PositionsInBurst in SIB1 or in ServingCellConfigCommon are mapped to valid PRACH occasions in the following order where the parameters are described in [4, TS 38.211].

First, in increasing order of preamble indexes within a single PRACH occasion

Second, in increasing order of frequency resource indexes for frequency multiplexed PRACH occasions Third, in increasing order of time resource indexes for time multiplexed PRACH occasions within a PRACH slot Fourth, in increasing order of indexes for PRACH slots An association period, starting from frame 0, for mapping SS/PBCH block indexes to PRACH occasions is the smallest value in the set determined by the PRACH configuration period according Table 8.1-1 such that $N_{Tx}^{SSB}$ SS/PBCH block indexes are mapped at least once to the PRACH occasions within the association period, where a UE obtains $N_{Tx}^{SSB}$ from the value of ssb-PositionsInBurst in SIB1 or in ServingCellConfigCommon. If after an integer number of SS/PBCH block indexes to PRACH occasions mapping cycles within the association period there is a set of PRACH occasions or PRACH preambles that are not mapped to $N_{Tx}^{SSB}$ SS/PBCH block indexes, no SS/PBCH block indexes are mapped to the set of PRACH occasions or PRACH preambles. An association pattern period includes one or more association periods and is determined so that a pattern between PRACH occasions and SS/PBCH block indexes repeats at most every 160 msec. PRACH occasions not associated with SS/PBCH block indexes after an integer number of association periods, if any, are not used for PRACH transmissions.

For a PRACH transmission triggered by a PDCCH order, the PRACH mask index field [5, TS 38.212], if the value of the random access preamble index field is not zero, indicates the PRACH occasion for the PRACH transmission where the PRACH occasions are associated with the SS/PBCH block index indicated by the SS/PBCH block index field of the PDCCH order.

For a PRACH transmission triggered by higher layers, if ssb-ResourceList is provided, the PRACH mask index is indicated by ra-ssb-OccasionMaskIndex which indicates the PRACH occasions for the PRACH transmission where the PRACH occasions are associated with the selected SS/PBCH block index.

The PRACH occasions are mapped consecutively per corresponding SS/PBCH block index. The indexing of the PRACH occasion indicated by the mask index value is reset per mapping cycle of consecutive PRACH occasions per SS/PBCH block index. The UE selects for a PRACH transmission the PRACH occasion indicated by PRACH mask index value for the indicated SS/PBCH block index in the first available mapping cycle.

For the indicated preamble index, the ordering of the PRACH occasions is

First, in increasing order of frequency resource indexes for frequency multiplexed PRACH occasions Second, in increasing order of time resource indexes for time multiplexed PRACH occasions within a PRACH slot Third, in increasing order of indexes for PRACH slots For a PRACH transmission triggered upon request by higher layers, a value of ra-OccasionList [12, TS 38.331], if csirs-ResourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

TABLE 8.1-1

| Mapping between PRACH configuration period and SS/PBCH block to PRACH occasion association period | |
|---|---|
| PRACH configuration period (msec) | Association period (number of PRACH configuration periods) |
| 10 | {1, 2, 4, 8, 16} |
| 20 | {1, 2, 4, 8} |
| 40 | {1, 2, 4} |
| 80 | {1, 2} |
| 160 | {1} |

For paired spectrum or supplementary uplink band all PRACH occasions are valid.

For unpaired spectrum, if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is provided in Table 8.1-2 and, if channelAccessMode=semistatic is provided, does not overlap with a set of consecutive symbols before the start of a next channel occupancy time where the UE does not transmit [15, TS 37.213].

the candidate SS/PBCH block index of the SS/PBCH block corresponds to the SS/PBCH block index provided by ssb-PositionsInBurst in SIB1 or in ServingCellConfigCommon, as described in clause 4.1

If a UE is provided tdd-UL-DL-ConfigurationCommon, a PRACH occasion in a PRACH slot is valid if it is within UL symbols, or it does not precede a SS/PBCH block in the PRACH slot and starts at least $N_{gap}$ symbols after a last downlink symbol and at least $N_{gap}$ symbols after a last SS/PBCH block symbol, where $N_{gap}$ is provided in Table 8.1-2, and if channelAccessMode=semistatic is provided, does not overlap with a set of consecutive symbols before the start of a next channel occupancy time where there shall not be any transmissions, as described in [15, TS 37.213]

the candidate SS/PBCH block index of the SS/PBCH block corresponds to the SS/PBCH block index provided by ssb-PositionsInBurst in SIB1 or in ServingCellConfigCommon, as described in clause 4.1.

For preamble format B4 [4, TS 38.211], $N_{gap}=0$ $N_{gap}=0$.

TABLE 8.1-2

| $N_{gap}$ values for different preamble SCS μ | |
|---|---|
| Preamble SCS | $N_{gap}$ |
| 1.25 kHz or 5 kHz | 0 |
| 15 kHz or 30 kHz or 60 kHz or 120 kHz | 2 |

If a random access procedure is initiated by a PDCCH order, the UE, if requested by higher layers, transmits a PRACH in the selected PRACH occasion, as described in [11, TS 38.321], for which a time between the last symbol of the PDCCH order reception and the first symbol of the PRACH transmission is larger than or equal to $N_{T,2}+\Delta_{BWPSwitching}+\Delta_{Delay}+T_{switch}$ msec, where $N_{T,2}$ is a time duration of $N_2$ symbols corresponding to a PUSCH preparation time for UE processing capability 1 [6, TS 38.214] assuming μ corresponds to the smallest SCS configuration between the SCS configuration of the PDCCH order and the SCS configuration of the corresponding PRACH transmission $\Delta_{BWPSwitching}=0$ if the active UL BWP does not change and $\Delta_{BWPSwitching}$ is defined in [10, TS 38.133] otherwise $\Delta_{Delay}=0.5$ msec for FR1 and $\Delta_{Delay}=0.25$ msec for FR2 $T_{switch}$ is a switching gap duration as defined in [6, TS 38.214]

For a PRACH transmission using 1.25 kHz or 5 kHz SCS, the UE determines $N_2$ assuming SCS configuration μ=0.

For single cell operation or for operation with carrier aggregation in a same frequency band, a UE does not transmit PRACH and PUSCH/PUCCH/SRS in a same slot or when a gap between the first or last symbol of a PRACH transmission in a first slot is separated by less than N symbols from the last or first symbol, respectively, of a PUSCH/PUCCH/SRS transmission in a second slot where N=2 for μ=0 or μ=1, N=4 for μ=2 or μ=3, and μ is the SCS configuration for the active UL BWP. For a PUSCH transmission with repetition Type B, this applies to each actual repetition for PUSCH transmission [6, TS 38.214].

8.1a PUSCH for Type-2 Random Access Procedure

For a Type-2 random access procedure, a UE transmits a PUSCH, when applicable, after transmitting a PRACH. The UE encodes a transport block provided for the PUSCH transmission using redundancy version number 0. The PUSCH transmission is after the PRACH transmission by at least N symbols where N=2 for μ=0 or μ=1, N=4 for μ=2 or μ=3, and μ is the SCS configuration for the active UL BWP. A UE does not transmit a PUSCH in a PUSCH occasion if the PUSCH occasion associated with a DMRS resource is not mapped to a preamble of valid PRACH occasions or if the associated PRACH preamble is not transmitted as described in clause 7.5 or clause 11.1. A UE can transmit a PRACH preamble in a valid PRACH occasion if the PRACH preamble is not mapped to a valid PUSCH occasion.

A mapping between one or multiple PRACH preambles and a PUSCH occasion associated with a DMRS resource is per PUSCH configuration.

A UE determines time resources and frequency resources for PUSCH occasions in an active UL BWP from msgA-PUSCH-Config for the active UL BWP. If the active UL BWP is not the initial UL BWP and msgA-PUSCH-Config is not provided for the active UL BWP, the UE uses the msgA-PUSCH-Config provided for the initial UL BWP.

A UE determines a first interlace or first RB for a first PUSCH occasion in an active UL BWP respectively from interlaceIndexFirstPO-MsgA-PUSCH or fromfrequencyStartMsgA-PUSCH that provides an offset, in number of RBs in the active UL BWP, from a first RB of the active UL BWP. A PUSCH occasion includes a number of interlaces or a number of RBs provided by nrofInterlacesPerMsgA-PO or by nrofPRBs-perMsgA-PO, respectively. Consecutive PUSCH occasions in the frequency domain of an UL BWP are separated by a number of RBs provided by guardBandMsgA-PUSCH. A number $N_f$ of PUSCH occasions in the frequency domain of an UL BWP is provided by nrofMsgA-PO-FDM.

For operation with shared spectrum channel access, if the PUSCH occasion is provided by higher layer parameters frequencyStartMsgA-PUSCH and nrofPRBs-perMsgA-PO, the UE expects a PUSCH occasion to be confined within the same RB set as the corresponding PRACH transmission.

For operation with shared spectrum channel access, if the PUSCH occasion is provided by higher layer parameters interlaceIndexFirstPO-MsgA-PUSCH and nrofInterlaces-PerMsgA-PO, the RB set for the PUSCH occasion in the active UL BWP is the same RB set as the corresponding PRACH transmission. The UE assumes that the RB set is defined as when the UE is not provided intraCellGuard-BandsPerSCS for an UL carrier as described in clause 7 of [6, TS 38.214].

If a UE does not have dedicated RRC configuration, or has an initial UL BWP as an active UL BWP, or is not provided startSymbolAndLengthMsgA-PO, msgA-PUSCH-timeDomainAllocation provides a SLIV and a PUSCH mapping type for a PUSCH transmission by indicating one of the first maxNrofUL-Allocations values from PUSCH-TimeDomainResourceAllocationList, if PUSCH-TimeDomainResourceAllocationList is provided in PUSCH-ConfigCommon one of the entries from table 6.1.2.1.1-2 or table 6.1.2.1.1-3 in [6, TS 38.214], if PUSCH-TimeDomainResourceAllocationList is not provided in PUSCH-ConfigCommon else, the UE is provided a SLIV by startSymbolAndLengthMsgA-PO, and a PUSCH mapping type by mappingTypeMsgA-PUSCH for a PUSCH transmission.

For mapping one or multiple preambles of a PRACH slot to a PUSCH occasion associated with a DMRS resource, a UE determines a first slot for a first PUSCH occasion in an active UL BWP from msgA-PUSCH-TimeDomainOffset that provides an offset, in number of slots in the active UL BWP, relative to the start of a PUSCH slot including the start of each PRACH slot. The UE does not expect to have a PRACH preamble transmission and a PUSCH transmission with a msgA in a PRACH slot or in a PUSCH slot, or to have overlapping msgA PUSCH occasions for a MsgA PUSCH configuration. The UE expects that a first PUSCH occasion in each slot has a same SLIV for a PUSCH transmission that is provided by startSymbolAndLengthMsgA-PO or msgA-PUSCH-timeDomainAllocation [6, TS 38.214].

Consecutive PUSCH occasions within each slot are separated by guardPeriodMsgA-PUSCH symbols and have same duration. A number $N_t$ of time domain PUSCH occasions in each slot is provided by nrofMsgA-PO-perSlot and a number $N_s$ of consecutive slots that include PUSCH occasions is provided by nrofSlotsMsgA-PUSCH.

A UE is provided a DMRS configuration for a PUSCH transmission in a PUSCH occasion in an active UL BWP by msgA-DMRS-Config.

A UE is provided an MCS for data information in a PUSCH transmission for a PUSCH occasion by msgA-MCS.

For a PUSCH transmission with frequency hopping in a slot, when indicated by msgA-intraSlotFrequencyHopping for the active UL BWP, the frequency offset for the second hop [6, TS 38.214] is determined as described in clause 8.3, Table 8.3-1 using msgA-HoppingBits instead of $N_{UL,hop}$. If guardPeriodMsgA-PUSCH is provided, a first symbol of the second hop is separated by guardPeriodMsgA-PUSCH symbols from the end of a last symbol of the first hop; otherwise, there is no time separation of the PUSCH transmission before and after frequency hopping. If a UE is provided with useInterlacePUCCH-PUSCH in BWP-UplinkCommon, the UE shall transmit PUSCH without frequency hopping. A PUSCH transmission uses a same spatial filter as an associated PRACH transmission.

A UE determines whether or not to apply transform precoding for a PUSCH transmission as described in [6, TS 38.214].

A PUSCH occasion for PUSCH transmission is defined by a frequency resource and a time resource, and is associated with a DMRS resource. The DMRS resources are provided by msgA-DMRS-Config.

Each consecutive number of $N_{preamble}$ preamble indexes from valid PRACH occasions in a PRACH slot first, in increasing order of preamble indexes within a single PRACH occasion second, in increasing order of frequency resource indexes for frequency multiplexed PRACH occasions third, in increasing order of time resource indexes for time multiplexed PRACH occasions within a PRACH slot are mapped to a valid PUSCH occasion and the associated DMRS resource first, in increasing order of frequency resource indexes $f_{id}$ for frequency multiplexed PUSCH occasions second, in increasing order of DMRS resource indexes within a PUSCH occasion, where a DMRS resource index $DMRS_{id}$ is determined first in an ascending order of a DMRS port index and second in an ascending order of a DMRS sequence index [4, TS 38.211]

third, in increasing order of time resource indexes $t_{id}$ for time multiplexed PUSCH occasions within a PUSCH slot fourth, in increasing order of indexes for $N_s$ PUSCH slots where $N_{preamble}=ceil(T_{preamble}/T_{PUSCH})$, $T_{preamble}$ is a total number of valid PRACH occasions per association pattern period multiplied by the number of preambles per valid PRACH occasion provided by rach-ConfigCommonTwoStepRA, and $T_{PUSCH}$ is a total number of valid PUSCH occasions per PUSCH configuration per association pattern period multiplied by the number of DMRS resource indexes per valid PUSCH occasion provided by msgA-DMRS-Config.

A PUSCH occasion is valid if it does not overlap in time and frequency with any valid PRACH occasion associated with either a Type-1 random access procedure or a Type-2 random access procedure. Additionally, for unpaired spectrum and for SS/PBCH blocks with indexes provided by ssb-PositionsInBurst in SIB1 or by Serving CellConfigCommon if a UE is not provided tdd-UL-DL-ConfigurationCommon, a PUSCH occasion is valid if the PUSCH occasion does not precede a SS/PBCH block in the PUSCH slot, and starts at least $N_{gap}$ symbols after a last SS/PBCH block symbol, where $N_{gap}$ is provided in Table 8.1-2 and, if channelAccessMode=semistatic is provided, does not overlap with a set of consecutive symbols before the start of a next channel occupancy time where the UE does not transmit [15, TS 37.213].

if a UE is provided tdd-UL-DL-ConfigurationCommon, a PUSCH occasion is valid if the PUSCH occasion is within UL symbols, or does not precede a SS/PBCH block in the PUSCH slot, and starts at least $N_{gap}$ symbols after a last downlink symbol and at least $N_{gap}$ symbols after a last SS/PBCH block symbol, where $N_{gap}$ is provided in Table 8.1-2 and, if channelAccessMode=semistatic is provided, does not overlap with a set of consecutive symbols before the start of a next channel occupancy time where the UE does not transmit [15, TS 37.213].

8.2 Random Access Response—Type-1 Random Access Procedure

In response to a PRACH transmission, a UE attempts to detect a DCI format 1_0 with CRC scrambled by a corresponding RA-RNTI during a window controlled by higher layers [11, TS 38.321]. The window starts at the first symbol of the earliest CORESET the UE is configured to receive PDCCH for Type1-PDCCH CSS set, as defined in clause 10.1, that is at least one symbol, after the last symbol of the PRACH occasion corresponding to the PRACH transmission, where the symbol duration corresponds to the SCS for Type1-PDCCH CSS set as defined in clause 10.1.

The length of the window in number of slots, based on the SCS for Type1-PDCCH CSS set, is provided by ra-ResponseWindow.

If the UE detects the DCI format 1_0 with CRC scrambled by the corresponding RA-RNTI and LSBs of a SFN field in the DCI format 1_0, if included and applicable, are same as corresponding LSBs of the SFN where the UE transmitted PRACH, and the UE receives a transport block in a corresponding PDSCH within the window, the UE passes the transport block to higher layers. The higher layers parse the transport block for a random access preamble identity (RAPID) associated with the PRACH transmission. If the higher layers identify the RAPID in RAR message(s) in the transport block, the higher layers indicate an uplink grant to the physical layer. This is referred to as random access response (RAR) UL grant in the physical layer.

If the UE does not detect the DCI format 1_0 with CRC scrambled by the corresponding RA-RNTI within the window, or if the UE detects the DCI format 1_0 with CRC scrambled by the corresponding RA-RNTI within the window and LSBs of a SFN field in the DCI format 1_0, if included and applicable, are not same as corresponding LSBs of the SFN where the UE transmitted PRACH, or if the UE does not correctly receive the transport block in the corresponding PDSCH within the window, or if the higher layers do not identify the RAPID associated with the PRACH transmission from the UE, the higher layers can indicate to the physical layer to transmit a PRACH. If requested by higher layers, the UE is expected to transmit a PRACH no later than $N_{T,1}+0.75$ msec after the last symbol of the window, or the last symbol of the PDSCH reception, where $N_{T,1}$ is a time duration of $N_1$ symbols corresponding to a PDSCH processing time for UE processing capability 1 assuming $\mu$ corresponds to the smallest SCS configuration among the SCS configurations for the PDCCH carrying the DCI format 1_0, the corresponding PDSCH when additional PDSCH DM-RS is configured, and the corresponding PRACH. For $\mu=0$, the UE assumes $N_{1,0}=14$ [6, TS 38.214]. For a PRACH transmission using 1.25 kHz or 5 kHz SCS, the UE determines $N_1$ assuming SCS configuration $\mu=0$.

If the UE detects a DCI format 1_0 with CRC scrambled by the corresponding RA-RNTI and LSBs of a SFN field in the DCI format 1_0, if included and applicable, are same as corresponding LSBs of the SFN where the UE transmitted the PRACH, and the UE receives a transport block in a corresponding PDSCH, the UE may assume same DM-RS antenna port quasi co-location properties, as described in [6, TS 38.214], as for a SS/PBCH block or a CSI-RS resource the UE used for PRACH association, as described in clause 8.1, regardless of whether or not the UE is provided TCI-State for the CORESET where the UE receives the PDCCH with the DCI format 1_0.

If the UE attempts to detect the DCI format 1_0 with CRC scrambled by the corresponding RA-RNTI in response to a PRACH transmission initiated by a PDCCH order that triggers a contention-free random access procedure for the SpCell [11, TS 38.321], the UE may assume that the PDCCH that includes the DCI format 1_0 and the PDCCH order have same DM-RS antenna port quasi co-location properties. If the UE attempts to detect the DCI format 1_0 with CRC scrambled by the corresponding RA-RNTI in response to a PRACH transmission initiated by a PDCCH order that triggers a contention-free random access procedure for a secondary cell, the UE may assume the DM-RS antenna port quasi co-location properties of the CORESET associated with the Type1-PDCCH CSS set for receiving the PDCCH that includes the DCI format 1_0.

A RAR UL grant schedules a PUSCH transmission from the UE. The contents of the RAR UL grant, starting with the MSB and ending with the LSB, are given in Table 8.2-1.

If the value of the frequency hopping flag is 0, the UE transmits the PUSCH without frequency hopping; otherwise, the UE transmits the PUSCH with frequency hopping. The UE determines the MCS of the PUSCH transmission from the first sixteen indexes of the applicable MCS index table for PUSCH as described in [6, TS 38.214].

The TPC command value $\delta_{msg2,b,f,c}$ is used for setting the power of the PUSCH transmission, as described in clause 7.1.1, and is interpreted according to Table 8.2-2.

The CSI request field is reserved.

The ChannelAccess-CPext field indicates a channel access type and CP extension for operation with shared spectrum channel access [15, TS 37.213] as defined in Table 7.3.1.1.1-4 in TS 38.212 or Table 7.3.1.1.1-4A in TS 38.212 if ChannelAccessMode-r16="semistatic" is provided. as defined in Table 7.3.1.1.1-4 in TS 38.212.

TABLE 8.2-1

| Random Access Response Grant Content field size | |
|---|---|
| RAR grant field | Number of bits |
| Frequency hopping flag | 1 |
| PUSCH frequency resource allocation | 14, for operation without shared spectrum channel access |
| | 12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access |
| | 2, for operation with shared spectrum channel access |

TABLE 8.2-2

| TPC Command $\delta_{msg\ 2,\ b,\ f,\ c}$ for PUSCH | |
|---|---|
| TPC Command | Value (in dB) |
| 0 | −6 |
| 1 | −4 |
| 2 | −2 |
| 3 | 0 |
| 4 | 2 |
| 5 | 4 |
| 6 | 6 |
| 7 | 8 |

Unless the UE is configured a SCS, the UE receives subsequent PDSCH using same SCS as for the PDSCH reception providing the RAR message.

If the UE does not detect the DCI format 1_0 with CRC scrambled by the corresponding RA-RNTI within the window, or if the UE detects the DCI format 1_0 with CRC scrambled by the corresponding RA-RNTI within the window and the LSBs of a SFN field in the DCI format 1_0, if included and applicable, are not same as corresponding LSBs of the SFN where the UE transmitted the PRACH, or the UE does not correctly receive a corresponding transport block within the window, the UE procedure is as described in [11, TS 38.321].

8.2a Random Access Response—Type-2 Random Access Procedure

In response to a transmission of a PRACH and a PUSCH, or to a transmission of only a PRACH if the PRACH preamble is mapped to a valid PUSCH occasion, a UE attempts to detect a DCI format 1_0 with CRC scrambled by a corresponding MsgB-RNTI during a window controlled by higher layers [11, TS 38.321]. The window starts at the first symbol of the earliest CORESET the UE is configured to receive PDCCH for Type1-PDCCH CSS set, as defined in clause 10.1, that is at least one symbol, after the last symbol of the PUSCH occasion corresponding to the PRACH transmission, where the symbol duration corresponds to the SCS for Type1-PDCCH CSS set. The length of the window in number of slots, based on the SCS for Type1-PDCCH CSS set, is provided by msgB-ResponseWindow.

In response to a transmission of a PRACH, if the PRACH preamble is not mapped to a valid PUSCH occasion, a UE attempts to detect a DCI format 1_0 with CRC scrambled by a corresponding MsgB-RNTI during a window controlled by higher layers [11, TS 38.321]. The window starts at the first symbol of the earliest CORESET the UE is configured to receive PDCCH for Type1-PDCCH CSS set, as defined in clause 10.1, that is at least one symbol, after the last symbol of the PRACH occasion corresponding to the PRACH transmission, where the symbol duration corresponds to the SCS for Type1-PDCCH CSS set. The length of the window in number of slots, based on the SCS for Type1-PDCCH CSS set, is provided by msgB-Response Window.

If the UE detects the DCI format 1_0, with CRC scrambled by the corresponding MsgB-RNTI and LSBs of a SFN field in the DCI format 1_0, if applicable, are same as corresponding LSBs of the SFN where the UE transmitted PRACH, and the UE receives a transport block in a corresponding PDSCH within the window, the UE passes the transport block to higher layers. The higher layers indicate to the physical layer an uplink grant if the RAR message(s) is for fallbackRAR and a random access preamble identity (RAPID) associated with the PRACH transmission is identified, and the UE procedure continues as described in clauses 8.2, 8.3, and 8.4 when the UE detects a RAR UL grant, or transmission of a PUCCH with HARQ-ACK information having ACK value if the RAR message(s) is for successRAR, where a PUCCH resource for the transmission of the PUCCH is indicated by PUCCH resource indicator field of 4 bits in the successRAR from a PUCCH resource set that is provided by pucch-ResourceCommon a slot for the PUCCH transmission is indicated by a HARQ Feedback Timing Indicator field of 3 bits in the successRAR having a value k from {1, 2, 3, 4, 5, 6, 7, 8} and, with reference to slots for PUCCH transmission having duration $T_{slot}$, the slot is determined as n+k+Δ, where n is a slot of the PDSCH reception and Δ is as defined for PUSCH transmission in Table 6.1.2.1.1-5 of [6, TS 38.214]

the UE does not expect the first symbol of the PUCCH transmission to be after the last symbol of the PDSCH reception by a time smaller than $N_{T,1}$+0.5 msec where $N_{T,1}$ is the PDSCH processing time for UE processing capability 1 [6, TS 38.214]

for operation with shared spectrum channel access, a channel access type and CP extension [15, TS 37.213] for a PUCCH transmission is indicated by a ChannelAccess-CPext field in the successRAR as defined in Table 7.3.1.1.1-4 in TS 38.212 as defined in Table 7.3.1.1.1-4 in TS 38.212 or Table 7.3.1.1.1-4A in TS 38.212 if ChannelAccessMode-r16="semistatic" is provided the PUCCH transmission is with a same spatial domain transmission filter and in a same active UL BWP as a last PUSCH transmission If the UE detects the DCI format 1_0 with CRC scrambled by a C-RNTI and a transport block in a corresponding PDSCH within the window, the UE transmits a PUCCH with HARQ-ACK information having ACK value if the UE correctly detects the transport block or NACK value if the UE incorrectly detects the transport block and the time alignment timer is running [11, TS 38.321].

If the UE detects a DCI format 1_0 with CRC scrambled by the corresponding MsgB-RNTI and receives a transport block within the window in a corresponding PDSCH, the UE may assume same DM-RS antenna port quasi co-location properties, as described in [6, TS 38.214], as for a SS/PBCH block the UE used for PRACH association, as described in clause 8.1, regardless of whether or not the UE is provided TCI-State for the CORESET where the UE receives the PDCCH with the DCI format 1_0.

The UE does not expect to be indicated to transmit the PUCCH with the HARQ-ACK information at a time that is prior to a time when the UE applies a TA command that is provided by the transport block. If the UE does not detect the DCI format 1_0 with CRC scrambled by the corresponding MsgB-RNTI within the window, or if the UE detects the DCI format 1_0 with CRC scrambled by the corresponding MsgB-RNTI within the window and LSBs of a SFN field in the DCI format 1_0, if applicable, are not same as corresponding LSBs of the SFN where the UE transmitted the PRACH, or if the UE does not correctly receive the transport block in the corresponding PDSCH within the window, or if the higher layers do not identify the RAPID associated with the PRACH transmission from the UE, the higher layers can indicate to the physical layer to transmit only PRACH according to Type-1 random access procedure or to transmit both PRACH and PUSCH according to Type-2 random access procedure [11, TS 38.321]. If requested by higher layers, the UE is expected to transmit a PRACH no later than $N_{T,1}$+0.75 msec after the last symbol of the window, or the last symbol of the PDSCH reception, where $N_{T,1}$ is a time duration of $N_1$ symbols corresponding to a PDSCH processing time for UE processing capability 1 when additional PDSCH DM-RS is configured. For $\mu$=0, the UE assumes $N_{1,0}$=14 [6, TS 38.214].

Unless the UE is configured a SCS, the UE receives subsequent PDSCH using same SCS as for the PDSCH reception providing the RAR message.

If the UE does not detect the DCI format 1_0 with CRC scrambled by the corresponding MsgB-RNTI within the window, or if the UE detects the 1_0 with CRC scrambled by the corresponding MsgB-RNTI within the window and LSBs of a SFN field in the DCI format 1_0, if applicable, are not same as corresponding LSBs of the SFN where the UE transmitted the PRACH, or the UE does not correctly receive a corresponding transport block within the window, the UE procedure is as described in [11, TS 38.321].

8.3 PUSCH Scheduled by RAR UL Grant

An active UL BWP, as described in clause 12 and in [4, TS 38.211], for a PUSCH transmission scheduled by a RAR UL grant is indicated by higher layers.

If useInterlacePUCCH-PUSCH is not provided by BWP-UplinkCommon and BWP-UplinkDedicated, for determining the frequency domain resource allocation for the PUSCH transmission within the active UL BWP if the active UL BWP and the initial UL BWP have same SCS and same CP length and the active UL BWP includes all RBs of the initial UL BWP, or the active UL BWP is the initial UL BWP, the initial UL BWP is used else, the RB numbering starts from the first RB of the active UL BWP and the maximum number of RBs for frequency domain resource allocation equals the number of RBs in the initial UL BWP The frequency domain resource allocation is by uplink resource allocation type 1 [6, TS 38.214]. For an initial UL BWP size of $N_{BWP}^{size}$ RBs, a UE processes the frequency domain resource assignment field as follows if $N_{BWP}^{size} \leq 180$, or for operation with shared spectrum channel access if $N_{BWP}^{size} \leq 90$ truncate the frequency domain resource assignment field to its $\lceil \log_2(N_{BWP}^{size} \cdot (N_{BWP}^{size}+1)/2) \rceil$ least significant bits and interpret the truncated frequency resource assignment field as for the frequency resource assignment field in DCI format 0_0 as described in [5, TS 38.212]

else insert $\lceil \log_2(N_{BWP}^{size} \cdot (N_{BWP}^{size}+1)/2) \rceil - 14$ most significant bits, or for operation with shared spectrum channel access insert $\lceil \log_2(N_{BWP}^{size} \cdot (N_{BWP}^{size}+1)/2) \rceil - 12$ most significant bits, with value set to '0' after the $N_{UL,hop}$ bits to the frequency domain resource assignment field, where $N_{UL,hop}$=0 if the frequency hopping flag is set to '0' and $N_{UL,hop}$ is provided in Table 8.3-1 if the hopping flag bit is set to '1', and interpret the expanded frequency resource assignment field as for the frequency resource assignment field in DCI format 0_0 as described in [5, TS 38.212]

end if

If useInterlacePUCCH-PUSCH is provided by BWP-UplinkCommon or BWP-UplinkDedicated, the frequency domain resource allocation is by uplink resource allocation type 2 [6, TS 38.214]. A UE processes the frequency domain resource assignment field as follows truncate the frequency domain resource assignment field to the X=6 LSBs if $\mu$=0, or to the X=5 LSBs if $\mu$=1 for interlace allocation of a PUSCH transmission, interpret the X MSBs of the truncated frequency domain resource assignment field for the active UL BWP as for the X MSBs of the frequency domain resource assignment field in DCI format 0_0 [6, TS 38.214]

for RB set allocation of a PUSCH transmission, the RB set of the active UL BWP is the RB set of the PRACH transmission associated with the RAR UL grant. The UE assumes that the RB set is defined as when the UE is not provided intraCellGuardBandsUL-List [6, TS 38.214].

A UE determines whether or not to apply transform precoding as described in [6, TS 38.214].

For a PUSCH transmission with frequency hopping scheduled by RAR UL grant or for a Msg3 PUSCH retransmission, the frequency offset for the second hop [6, TS 38.214] is given in Table 8.3-1.

TABLE 8.3-1

| Frequency offset for second hop of PUSCH transmission with frequency hopping scheduled by RAR UL grant or of Msg3 PUSCH retransmission | | |
|---|---|---|
| Number of PRBs in initial UL BWP | Value of $N_{UL, hop}$ Hopping Bits | Frequency offset for $2^{nd}$ hop |
| $N_{BWP}^{size} < 50$ | 0 | $[N_{BWP}^{size}/2]$ |
| | 1 | $[N_{BWP}^{size}/4]$ |
| $N_{BWP}^{size} \geq 50$ | 00 | $[N_{BWP}^{size}/2]$ |
| | 01 | $[N_{BWP}^{size}/4]$ |
| | 10 | $-[N_{BWP}^{size}/4]$ |
| | 11 | Reserved |

A SCS for the PUSCH transmission is provided by subcarrierSpacing in BWP-UplinkCommon. A UE transmits PRACH and the PUSCH on a same uplink carrier of a same serving cell.

A UE transmits a transport block in a PUSCH scheduled by a RAR UL grant in a corresponding RAR message using redundancy version number 0. If a TC-RNTI is provided by higher layers, the scrambling initialization of the PUSCH corresponding to the RAR UL grant in clause 8.2 is by TC-RNTI. Otherwise, the scrambling initialization of the PUSCH corresponding to the RAR UL grant in clause 8.2 is by C-RNTI. Msg3 PUSCH retransmissions, if any, of the transport block, are scheduled by a DCI format 0_0 with CRC scrambled by a TC-RNTI provided in the corresponding RAR message [11, TS 38.321]. The UE always transmits the PUSCH scheduled by a RAR UL grant without repetitions.

With reference to slots for a PUSCH transmission scheduled by a RAR UL grant, if a UE receives a PDSCH with a RAR message ending in slot n for a corresponding PRACH transmission from the UE, the UE transmits the PUSCH in slot $n+k_2+\Delta$, where $k_2$ and $\Delta$ are provided in [6, TS 38.214]. The UE may assume a minimum time between the last symbol of a PDSCH reception conveying a RAR message with a RAR UL grant and the first symbol of a corresponding PUSCH transmission scheduled by the RAR UL grant is equal to $N_{T,1}+N_{T,2}+0.5$ msec, where $N_{T,1}$ is a time duration of $N_1$ symbols corresponding to a PDSCH processing time for UE processing capability 1 when additional PDSCH DM-RS is configured, $N_{T,2}$ is a time duration of $N_2$ symbols corresponding to a PUSCH preparation time for UE processing capability 1 [6, TS 38.214] and, for determining the minimum time, the UE considers that $N_1$ and $N_2$ correspond to the smaller of the SCS configurations for the PDSCH and the PUSCH. For $\mu=0$, the UE assumes $N_{1,0}=14$ [6, TS 38.214].

8.4 PDSCH with UE Contention Resolution Identity

In response to a PUSCH transmission scheduled by a RAR UL grant when a UE has not been provided a C-RNTI, the UE attempts to detect a DCI format 1_0 with CRC scrambled by a corresponding TC-RNTI scheduling a PDSCH that includes a UE contention resolution identity [11, TS 38.321]. In response to the PDSCH reception with the UE contention resolution identity, the UE transmits HARQ-ACK information in a PUCCH. The PUCCH transmission is within a same active UL BWP as the PUSCH transmission. A minimum time between the last symbol of the PDSCH reception and the first symbol of the corresponding PUCCH transmission with the HARQ-ACK information is equal to $N_{T,1}+0.5$ msec. $N_{T,1}$ is a time duration of $N_1$ symbols corresponding to a PDSCH processing time for UE processing capability 1 when additional PDSCH DM-RS is configured. For $\mu=0$, the UE assumes $N_{1,0}=14$ [6, TS 38.214].

When detecting a DCI format in response to a PUSCH transmission scheduled by a RAR UL grant, as described in [11, TS 38.321], or corresponding PUSCH retransmission scheduled by a DCI format 0_0 with CRC scrambled by a TC-RNTI provided in the corresponding RAR message [11, TS 38.321], the UE may assume the PDCCH carrying the DCI format has the same DM-RS antenna port quasi co-location properties, as described in [6, TS 38.214], as for a SS/PBCH block the UE used for PRACH association, as described in clause 8.1, regardless of whether or not the UE is provided TCI-State for the CORESET where the UE receives the PDCCH with the DCI format.

Quotation End

Quotation Start 7.3.1.1 DCI Formats for Scheduling of PUSCH
7.3.1.1.1 Format 0_0
DCI format 0_0 is used for the scheduling of PUSCH in one cell.

The following information is transmitted by means of the DCI format 0_0 with CRC scrambled by C-RNTI or CS-RNTI or MCS-C-RNTI:

. . .

ChannelAccess-CPext—2 bits indicating combinations of channel access type and CP extension as defined in Table 7.3.1.1.1-4, or Table 7.3.1.1.1.4A, if ChannelAccessMode-r16="semistatic" is provided for operation in a cell with shared spectrum channel access; 0 bit otherwise.

The following information is transmitted by means of the DCI format 0_0 with CRC scrambled by TC-RNTI:

. . .

ChannelAccess-CPext—2 bits indicating combinations of channel access type and CP extension as defined in Table 7.3.1.1.1-4, or Table 7.3.1.1.1.4A, if ChannelAccessMode-r16="semistatic" is provided for operation in a cell with shared spectrum channel access; 0 bit otherwise

TABLE 7.3.1.1.1-4

| Channel access type & CP extension for DCI format 0_0 and DCI format 1_0 | | |
|---|---|---|
| Bit field mapped to index | Channel Access Type | The CP extension T_"ext" index defined in Clause 5.3.1 of [4, TS 38.211] |
| 0 | Type2C-ULChannelAccess defined in [clause 4.2.1.2.3 in 37.213] | 2 |
| 1 | Type2A-ULChannelAccess defined in [clause 4.2.1.2.1 in 37.213] | 3 |
| 2 | Type2A-ULChannelAccess defined in [clause 4.2.1.2.1 in37.213] | 1 |
| 3 | Type1-ULChannelAccess defined in [clause 4.2.1.1 in 37.213] | 0 |

TABLE 7.3.1.1.1-4A

| Channel access type & CP extension if ChannelAccessMode-r16 = "semistatic" is provided | |
| --- | --- |
| Bit field mapped to index Channel Access Type | The CP extension T_"ext" index defined in Clause 5.3.1 of [4, TS 38.211] |
| 0   No sensing as defined in Clause 4.3 in TS 37.213 | 0 |
| 1   No sensing as defined in Clause 4.3 in TS 37.213 | 2 |
| 2   9 us sensing within a 25 us interval as defined in Clause 4.3 in TS 37.213 | 0 |
| 3   — | — |

When operating in unlicensed/shared spectrum, channel access related procedure, such as LBT, would be performed as mentioned above. However, there could be some exceptional case(s) where channel access related procedure could be skipped in unlicensed/shared spectrum. For example, a UE could be indicated to adopt no-LBT mode, so that UE does not require to perform LBT before transmission or skip LBT. In another example, for some channel/signal, transmission could be performed directly without channel access related procedure, e.g., without listening/without detecting whether the channel is busy/occupied. More details of the exceptional channel/signal could be found in the following quotation from [5] 3GPP TS 38.212 V16.6.0:

Quotation Start

Agreement:
For regions where LBT is not mandated, gNB should indicate to the UE this gNB-UE connection is operating in LBT mode or no-LBT mode Support both cell specific (common for all UEs in a cell as part of system information or dedicated RRC signalling or both) and UE specific (can be different for different UEs in a cell as part of UE-specific RRC configuration) gNB indication Agreement:
  Contention Exempt Short Control Signaling rules apply to the transmission of msg1 for the 4 step RACH and MsgA for the 2-step RACH for all supported SCS.

Note restriction for short control signalling transmissions apply (10% over any 100 ms intervals)

Alt 1: The 10% over any 100 ms interval restriction is applicable to all available msg1/msgA resources configured (not limited to the resources actually used) in a cell Alt 2: The 10% over any 100 ms interval restriction is applicable to the msg1/msgA transmission from one UE perspective FFS: Other UL signals/channels can be transmitted with Contention Exempt Short Control Signaling rule, such as msg3, SRS, PUCCH, PUSCH without user plain data, etc Quotation End Issues and Solutions
  As detailed above, there would be indication of channel access type and cyclic prefix (CP) extension in Random Access Response (RAR) grant in unlicensed spectrum (e.g., shared spectrum). The User Equipment (UE) would apply the indicated channel access type and CP extension for its Msg3 Physical Uplink Shared Channel (PUSCH) transmission. Such a field would be absent for licensed spectrum. However, to keep bit-width/size of RAR grant constant, two bits are borrowed from the resource allocation (e.g., frequency domain) field. In other words, the interpretation of RAR grant would be different for the case when indication of channel access type and CP extension is present and for the case when indication of channel access type and CP extension is absent. (Interpretation of) Resource allocation for Msg3 would also be different for the case when indication of channel access type and CP extension is present and for the case when indication of channel access type and CP extension is absent since there is a two bit difference of the resource allocation field.

There could be different mechanisms/policies to determine whether channel access scheme, e.g., listen-before-talk (LBT), is required to perform for a transmission. A first factor is a LBT mode of a device. For example, if a device is under No-LBT mode, the device could perform transmission without LBT. On the other hand, if a device is under LBT mode, the device may be required to perform transmission with LBT, e.g., for most cases. Furthermore, even if a device is under LBT mode, some signal/channel/message, e.g., preamble, could be exempted from LBT. In other words, for some channels/signals/messages, LBT is not required for all devices in unlicensed/shared spectrum irrespective of LBT mode(s) of the devices. While for some other channels/signals/messages, LBT may or may not be performed, e.g., subject to LBT mode of a device. With the introduction of LBT mode, Msg3 PUSCH may or may not require LBT. An issue of whether and/or how to handle the indication of channel access type and CP extension would arise.

A first concept of the invention is to interpret RAR at least based on a LBT mode of a UE. A UE determines whether indication of channel access type and/or CP extension is present in RAR at least based on a LBT mode of a UE. A UE determines indication of channel access type and/or CP extension is present in RAR if its LBT mode is "LBT mode", e.g., a mode that UE perform LBT for normal cases. A UE determines indication of channel access type and/or CP extension is absent in RAR if its LBT mode is "No-LBT mode", e.g., a mode that UE does not perform LBT for normal cases. A UE would determine a bit-width/size of resource allocation field in RAR at least based on a LBT mode of a UE. A UE would determine a first bit-width/size of resource allocation field in RAR if its LBT mode is "LBT mode". A UE would determine a second bit-width/size of resource allocation field in RAR if its LBT mode is "No-LBT mode". The second bit-width/size is larger than the first bit-width/size. The second bit-width/size has two more bits than the first bit-width/size. The UE operates in unlicensed/shared spectrum.

A second concept of the invention is to determine a channel access type and/or CP extension of a Msg3 based on a LBT mode of a UE. The channel access type and/or CP extension could be different from access type and/or CP extension indicated by a RAR grant. The UE uses a first channel access type and/or a first CP extension for a Msg3. A second channel access type and/or a second CP extension is indicated by a RAR grant. Indication of channel access type and/or CP extension is present in a RAR grant.

A third concept of the invention is to determine a channel access type and/or CP extension of a Msg3 based on indication in a RAR grant irrespective of a LBT mode of a UE. The UE apply a first channel access type and/or a first CP extension of a Msg3. The UE is in "No-LBT mode". The UE performs LBT for Msg3 PUSCH. The UE does not perform LBT for other PUSCH. Indication of channel access type and/or CP extension is present in a RAR grant.

A fourth concept of this invention is a mixed of second and third concept, to determine a channel access type and/or CP extension of a Msg3 partly based on a LBT mode of a UE and partly based on indication in a RAR grant. For example, channel access type is determined based on LBT mode of a UE and CP extension is determined based on indication in a RAR grant. The UE is in No-LBT mode. The UE does not perform LBT for Msg3 while apply CP extension for Msg3. Indication of channel access type and/or CP extension is present in a RAR grant.

In one embodiment, a UE determines whether indication of channel access type and/or CP extension is present in RAR at least based on a LBT mode of the UE. A random access procedure is triggered. The UE determines indication of channel access type and/or CP extension is absent if its LBT mode is a first LBT mode. The UE determines indication of channel access type and/or CP extension is present if its LBT mode is a second LBT mode. The UE does not perform LBT for Msg3 if an indication of channel access type is absent. The UE does not extend CP for Msg3 if an indication of CP extension is absent. The UE performs LBT for Msg3 if an indication of channel access type is present. The UE extends CP for Msg3 if an indication of CP extension is present. A UE determines a bit-width/size of resource allocation field in RAR at least based on a LBT mode of the UE. The UE determines a first bit-width/size of resource allocation field in RAR if its LBT mode is a first LBT mode. The UE determines a second bit-width/size of resource allocation field in RAR if its LBT mode is a second LBT mode. The UE operates in shared/unlicensed spectrum.

The UE selects a first preamble if its LBT mode is a first LBT mode. The UE selects a second preamble if its LBT mode is a second LBT mode. The UE transmits the first preamble if its LBT mode is a first LBT mode. The UE transmits the second preamble if its LBT mode is a second LBT mode. A first set of preambles is associated with a first LBT mode. A second set of preambles is associated with a second LBT mode. The UE selects preamble within the set of preamble(s) associated with its LBT mode. The UE selects a preamble within the first set of preamble(s) if its LBT mode is a first LBT mode. The UE selects a preamble within the second set of preamble(s) if its LBT mode is a second LBT mode. The UE transmits a preamble within the first set of preambles if its LBT mode is a first LBT mode. The UE transmits a preamble within the second set of preambles if its LBT mode is a second LBT mode.

A first Physical Random Access Channel (PRACH) resource(s) is associated with a first LBT mode. A second PRACH resource(s) is associated with a second LBT mode. The UE selects PRACH resource associated with its LBT mode. The UE selects the first PRACH resource(s) if its LBT mode is a first LBT mode. The UE selects the second PRACH resource(s) if its LBT mode is a second LBT mode. The UE transmits a preamble within the first PRACH resource(s) if its LBT mode is a first LBT mode. The UE transmits a preamble within the second PRACH resource(s) if its LBT mode is a second LBT mode. LBT mode could be one of "No LBT mode" or "LBT mode" (e.g., a mode that UE perform LBT for normal cases).

A first LBT mode could be a "No-LBT mode". A second LBT mode could be a "LBT mode". (e.g., a mode that UE performs LBT for normal cases). A first LBT mode could be a LBT mode associated with a first (set of) LBT related parameter(s). A second LBT mode could be a LBT mode associated with a second (set of) LBT related parameter(s). LBT mode of the UE could be indicated by another device. LBT mode of the UE could be indicated by a base station. LBT mode of the UE could be indicated by another UE. LBT mode of the UE could be determined by the UE itself. LBT mode of the UE could be determined by a rule. Association between preamble(s) and LBT mode(s) could be indicated by a base station. Association between preamble(s) and LBT mode(s) could be indicated by RRC configuration. Accordingly, a base station could identify a LBT mode of a UE transmitting the preamble. A base station could realize whether LBT is required for Msg3. A base station could allocate Msg3 resource accordingly, e.g., allocating resource for Msg3 based on whether LBT is required for Msg3. A base station could transmit RAR accordingly, e.g., setting the content of RAR (e.g., RAR grant) based on whether LBT is required for Msg3.

In another embodiment, a base station determines whether indication of channel access type and/or CP extension is present in RAR at least based on a LBT mode of the UE. A random access procedure is triggered. The base station determines indication of channel access type and/or CP extension is absent if its LBT mode is a first LBT mode. The base station determines indication of channel access type and/or CP extension is present if its LBT mode is a second LBT mode. The UE does not perform LBT for Msg 3 if an indication of channel access type is absent. The UE does not extend CP for Msg3 if an indication of CP extension is absent. The UE performs LBT for Msg3 if an indication of channel access type is present. The UE extends CP for Msg3 if an indication of CP extension is present. A base station determines a bit-width/size of resource allocation field in RAR at least based on a LBT mode of the UE. The base station determines a first bit-width/size of resource allocation field in RAR if its LBT mode is a first LBT mode. The base station determines a second bit-width/size of resource allocation field in RAR if its LBT mode is a second LBT mode. The UE operates in shared/unlicensed spectrum.

A base station determines LBT mode of a UE at least based on a preamble and/or PRACH resource detected. Preamble is transmitted by the UE. A random access procedure is triggered by the UE. A base station determines LBT mode of a UE based on a preamble detected. A base station determines LBT mode of a UE based on PRACH resource(s) where a preamble is detected. A first preamble is associated with a first LBT mode. A second preamble is associated with a second LBT mode. The base station determines LBT mode is a first LBT mode if the first preamble is detected. The base station determines LBT mode is a second LBT mode if the second preamble is detected. A first set of preambles is associated with a first LBT mode. A second set of preambles is associated with a second LBT mode. The base station determines LBT mode is a first LBT mode if a preamble within the first set of preambles is detected. The base station determines LBT mode is a second LBT mode if a preamble within the second set of preambles is detected.

A first PRACH resource(s) is associated with a first LBT mode. A second PRACH resource(s) is associated with a second LBT mode. The base station determines LBT mode is a first LBT mode if a preamble within the first PRACH resource(s) is detected. The base station determines LBT mode is a second LBT mode if a preamble within the second PRACH resource(s) is detected. LBT mode could be one of "No LBT mode" or "LBT mode" (e.g., a mode that UE perform LBT for normal cases).

A first LBT mode could be a "No-LBT mode". A second LBT mode could be a "LBT mode". (e.g., a mode that UE performs LBT for normal cases). A first LBT mode could be a LBT mode associated with a first (set of) LBT related parameter(s). A second LBT mode could be a LBT mode associated with a second (set of) LBT related parameter(s). LBT mode of the UE could be indicated by another device. LBT mode of the UE could be indicated by a base station. LBT mode of the UE could be indicated by another UE. LBT mode of the UE could be determined by the UE itself. LBT mode of the UE could be determined by a rule. Association between preamble(s) and LBT mode(s) could be indicated by a base station. Association between preamble(s) and LBT mode(s) could be indicated by RRC configuration. Accordingly, a base station could identify a LBT mode of a UE transmitting the preamble. A base station could realize whether LBT is required for Msg3. A base station could allocate Msg3 resource accordingly, e.g., allocating resource for Msg3 based on whether LBT is required for Msg3. A base station could transmit RAR accordingly, e.g., setting the content of RAR (e.g., RAR grant) based on whether LBT is required for Msg3.

In another embodiment, a UE determines a channel access type for Msg3 at least based on a LBT mode of a UE. A UE determines a channel access type for Msg3 at least based on indication in a RAR grant. A UE does not determine channel access type for Msg3 based on a LBT mode of a UE. A UE does not determine a channel access type for Msg3 based on indication in a RAR grant. A UE determines a CP extension for Msg3 at least based on a LBT mode of a UE. A UE determines a CP extension for Msg3 at least based on indication in a RAR grant. A UE does not determine CP extension for Msg3 based on a LBT mode of a UE. A UE does not determine a channel access type for Msg3 based on indication in a RAR grant. Indication of channel access type and/or CP extension is present in a RAR grant. The UE operates in shared/unlicensed spectrum. ChannelAccess-Mode-r16="semistatic" is not provided for operation in a cell. A UE performs LBT for Msg3 according to indication of a channel access type for Msg3 irrespective of its LBT mode. A UE performs LBT for Msg3 according to its LBT mode irrespective of indication of a channel access type for Msg3. A UE performs CP extension for Msg3 according to indication of a CP extension for Msg3 irrespective of its LBT mode. A UE performs CP extension for Msg3 according to its LBT mode irrespective of indication of a CP extension for Msg3. The UE is in "No-LBT mode". The UE is in "LBT mode". RAR indicates the UE to perform LBT. RAR indicates the UE not to perform LBT. The UE performs CP extension in "LBT mode". The UE does not perform CP extension in "No-LBT mode". RAR indicates the UE to perform CP extension. RAR indicates the UE not to perform CP extension.

A Random access procedure is initiated. The random access procedure is contention based random access procedure. The UE is in No-LBT mode. The UE perform LBT for Msg 3 PUSCH. The UE does not perform LBT for a PUSCH which is not Msg3 PUSCH. The UE determines whether to perform LBT for a transmission based on type of transmission. The UE determines whether to perform LBT for a transmission based on type of PUSCH. The UE performs LBT for Msg3 PUSCH. The UE does not perform LBT for a PUSCH which is not Msg3 PUSCH transmission. The UE skips LBT for a PUSCH which is not Msg3 PUSCH transmission. UE shall perform LBT for Msg3 PUSCH. UE is allowed not to perform LBT for other PUSCH. UE could skip LBT for other PUSCH. LBT mode could be one of "No LBT mode" or "LBT mode" (e.g., a mode that UE perform LBT for normal cases). A first LBT mode could be a "No-LBT mode". A second LBT mode could be a "LBT mode". (e.g., a mode that UE performs LBT for normal cases). LBT mode of the UE could be indicated by another device. LBT mode of the UE could be indicated by a base station. LBT mode of the UE could be indicated by another UE. LBT mode of the UE could be determined by the UE itself. LBT mode of the UE could be determined by a rule.

The LBT mode could be determined (at least) based on an indication. The indication could be received on the beam. The indication could be received on/with a (downlink (DL)) beam (e.g., Transmission Configuration Indicator (TCI) state) associated with the beam. The indication could be received on/with a beam (beam direction) different from (beam direction of) the beam. The indication could be received on/with a (DL) beam (e.g., TCI state) which is associated with the beam. The indication indicates a LBT mode. The LBT mode could comprise a mode base station performs LBT. The LBT mode could comprise a mode base station does not perform LBT. In a first LBT mode, the base station does not perform LBT. In a second LBT mode, the base station performs LBT. The base station does not determine LBT mode based on indication received on a second beam. The second beam is different from the beam. Beam direction of the second beam is different from beam direction of the beam. The second beam is not associated with the beam. The base station determines LBT mode(s) separately for each beam. The base station determines a first LBT mode for a first beam. The base station determines a second LBT mode for a second beam.

The LBT mode could be omni-directional LBT. The LBT mode could be directional LBT. The LBT mode could be a receiver-assistant LBT. Different values for LBT parameter could be associated with different LBT modes. LBT parameter could be a (energy detection) threshold for LBT. LBT parameter could be a (contention) window size for LBT. The device could be a base station. The device could be a UE. The transmission could be a PUSCH transmission. The transmission could be a Physical Uplink Control Channel (PUCCH) transmission. The transmission could be a PRACH transmission. The transmission could be a Sounding Reference Signal (SRS) transmission.

The LBT could be associated with a DL channel access procedure. The LBT could be associated with a type 1 DL channel access procedure. The LBT could be associated with a type 2 DL channel access procedure. The LBT could be associated with a type 2A DL channel access procedure. The LBT could be associated with a type 2B DL channel access procedure. The LBT could be associated with a type 2C DL channel access procedure. The LBT could be associated with a type A multi-channel access procedure. The LBT could be associated with a type A1 multi-channel access procedure. The LBT could be associated with a type A2 multi-channel access procedure. The LBT could be associated with a type B multi-channel access procedure. The LBT could be associated with a type B1 multi-channel access procedure. The LBT could be associated with a type B2 multi-channel access procedure. The LBT could be associated with an UL channel access procedure. The LBT could be associated with a type 1 UL channel access procedure. The LBT could be associated with a type 2 UL channel access procedure. The LBT could be associated with a type 2A UL channel access procedure. The LBT could be associated with a type 2B UL channel access procedure. The LBT could be associated with a type 2C UL channel access procedure.

For any of the embodiments of the present invention, LBT could be replaced with a channel access scheme or a channel access mechanism.

For any of the embodiments of the present invention, the invention describes behavior or operation of a single serving cell unless otherwise noted.

For any of the embodiments of the present invention, the invention describes behavior or operation of multiple serving cells unless otherwise noted.

For any of the embodiments of the present invention, the invention describes behavior or operation of a single bandwidth part unless otherwise noted.

For any of the embodiments of the present invention, a base station configures multiple bandwidth parts to the UE unless otherwise noted.

For any of the embodiments of the present invention, a base station configures a single bandwidth part to the UE unless otherwise noted.

Figure 7:
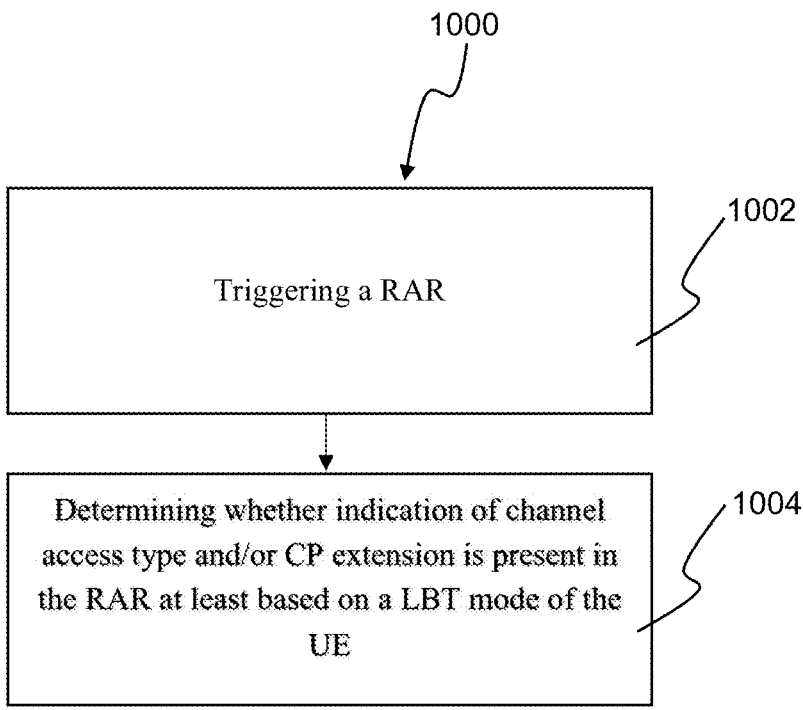
FIG. 7 is a flow diagram of a method of a UE comprising triggering a RAR and determining whether indication of channel access type and/or CP extension is present in the RAR at least based on a LBT mode of the UE, in accordance with embodiments of the present invention.
Figure 8:
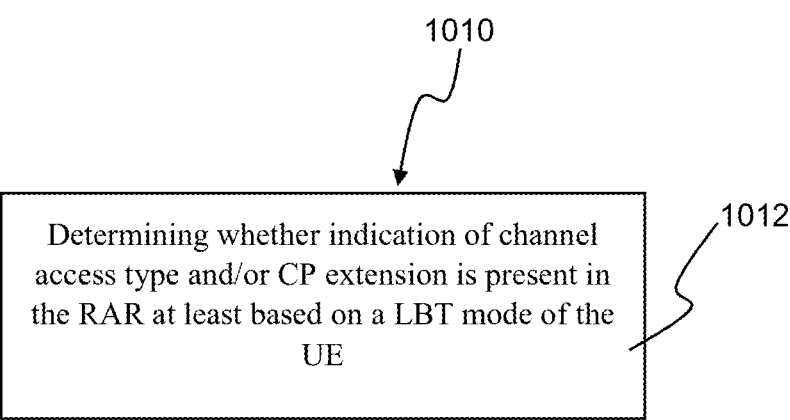
FIG. 8 is a flow diagram of a method of a base station comprising determining whether indication of channel access type and/or CP extension is present in the RAR at least based on a LBT mode of the UE, in accordance with embodiments of the present invention.

Referring to FIG. 7, with this and other concepts, systems, and methods of the present invention, a method 1000 for a UE in a wireless communication system comprises triggering a RAR (step 1002) and determining whether indication of channel access type and/or CP extension is present in the RAR at least based on a LBT mode of the UE (step 1004). Referring to FIG. 8, with this and other concepts, systems, and methods of the present invention, a method 1010 for a base station in a wireless communication system comprises determining whether indication of channel access type and/or CP extension is present in the RAR at least based on a LBT mode of the UE (step 1012).

In various embodiments, the UE operates in shared spectrum.

In various embodiments, the UE determines indication of channel access type and/or CP extension is absent if its LBT mode is a first LBT mode.

In various embodiments, the UE determines indication of channel access type and/or CP extension is present if its LBT mode is a second LBT mode.

In various embodiments, the UE does not perform LBT for Msg3 if an indication of channel access type is absent.

In various embodiments, the UE does not extend CP for Msg3 if an indication of CP extension is absent.

In various embodiments, the UE performs LBT for Msg3 if an indication of channel access type is present.

In various embodiments, the UE extends CP for Msg3 if an indication of CP extension is present.

In various embodiments, the UE determines a bit-width/size of resource allocation field in the RAR at least based on a LBT mode of the UE.

In various embodiments, the UE determines a first bit-width/size of resource allocation field in the RAR if its LBT mode is a first LBT mode.

In various embodiments, the UE determines a second bit-width/size of resource allocation field in the RAR if its LBT mode is a second LBT mode.

Referring back to FIGS. 3 and 4, in one or more embodiments from the perspective of a UE, the device 300 includes a program code 312 stored in memory 310 of the transmitter. The CPU 308 could execute program code 312 to: (i) trigger a RAR, and (ii) determine whether indication of channel access type and/or CP extension is present in the RAR at least based on a LBT mode of the UE. Moreover, the CPU 308 can execute the program code 312 to perform all of the described actions, steps, and methods described above, below, or otherwise herein.

Referring again back to FIGS. 3 and 4, in one or more embodiments from the perspective of a base station, the device 300 includes a program code 312 stored in memory 310 of the transmitter. The CPU 308 could execute program code 312 to: (i) determine whether indication of channel access type and/or CP extension is present in the RAR at least based on a LBT mode of the UE. Moreover, the CPU 308 can execute the program code 312 to perform all of the described actions, steps, and methods described above, below, or otherwise herein.

Figure 9:
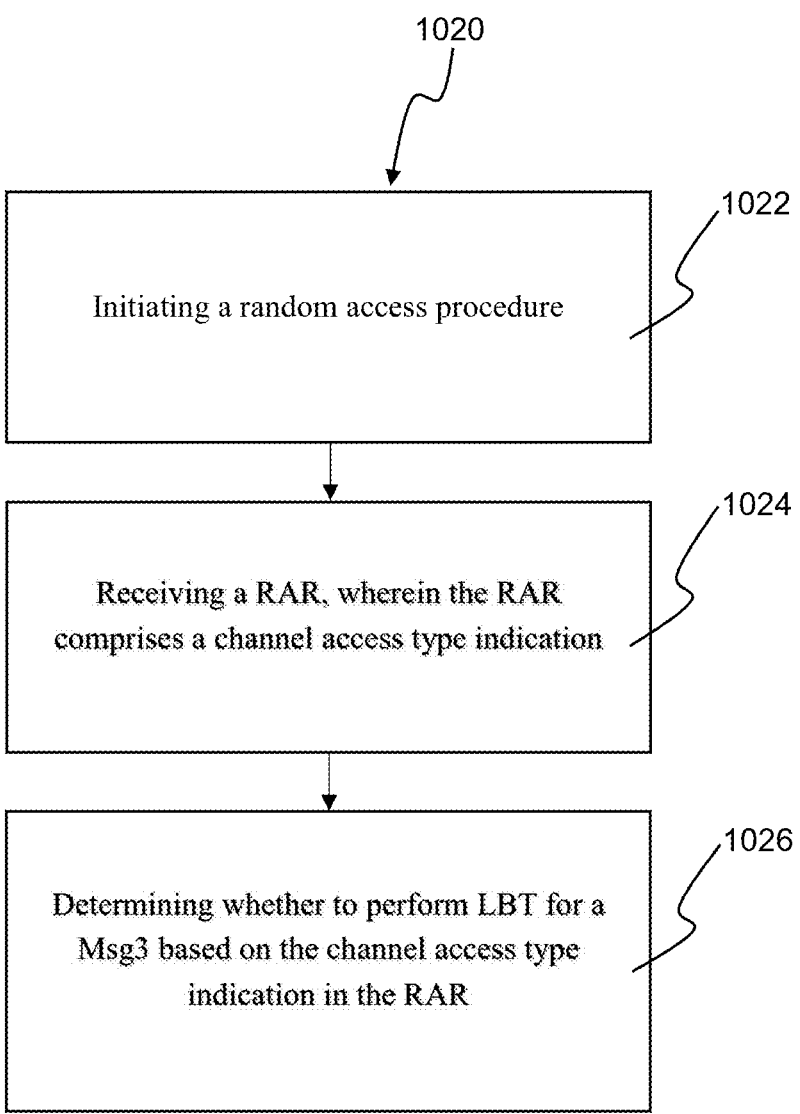
FIG. 9 is a flow diagram of a method of a UE comprising initiating a random access procedure and receiving a RAR, wherein the RAR comprises a channel access type indication, in accordance with embodiments of the present invention.

Referring to FIG. 9, with this and other concepts, systems, and methods of the present invention, a method 1020 for a UE in a wireless communication system comprises initiating a random access procedure (step 1022), receiving a RAR, wherein the RAR comprises a channel access type indication (step 1024), and determining whether to perform LBT for a Msg3 based on the channel access type indication in the RAR (step 1026).

In various embodiments, the UE does not perform LBT for the Msg3 if/when channel access type indication in the RAR indicates the UE not to perform LBT. The UE performs LBT for the Msg3 if/when channel access type indication in the RAR indicates the UE to perform LBT.

In various embodiments, the UE determines whether to perform LBT for a Msg3 based on the channel access type indication in the RAR when the UE is in LBT mode and/or when the UE is configured to perform LBT.

In various embodiments, the UE determines whether to perform LBT for a Msg3 based on its LBT mode irrespective of the channel access type indication in the random access response when the UE is in No-LBT mode and/or when the UE is configured not to perform LBT.

In various embodiments, the UE does not perform LBT for the Msg3 when the UE is No-LBT mode and/or when the UE is configured not to perform LBT.

In various embodiments, the UE ignores the channel access type indication in the RAR when the UE is in No-LBT mode and/or when the UE is configured not to perform LBT.

In various embodiments, the UE determines how to interpret the channel access type indication based on its LBT mode.

In various embodiments, the UE operates in a shared spectrum.

In various embodiments, ChannelAccessMode-r16="semistatic" is not provided.

In various embodiments, LBT refers to a channel access scheme and/or sensing a channel for performing transmission.

Referring back to FIGS. 3 and 4, in one or more embodiments from the perspective of a UE, the device 300 includes a program code 312 stored in memory 310 of the transmitter. The CPU 308 could execute program code 312 to: (i) initiate a random access procedure, (ii) receive a RAR, wherein the RAR comprises a channel access type indication, and (iii) determine whether to perform LBT for a Msg3 based on the channel access type indication in the RAR. Moreover, the CPU 308 can execute the program code 312 to perform all of the described actions, steps, and methods described above, below, or otherwise herein.

Figure 10:
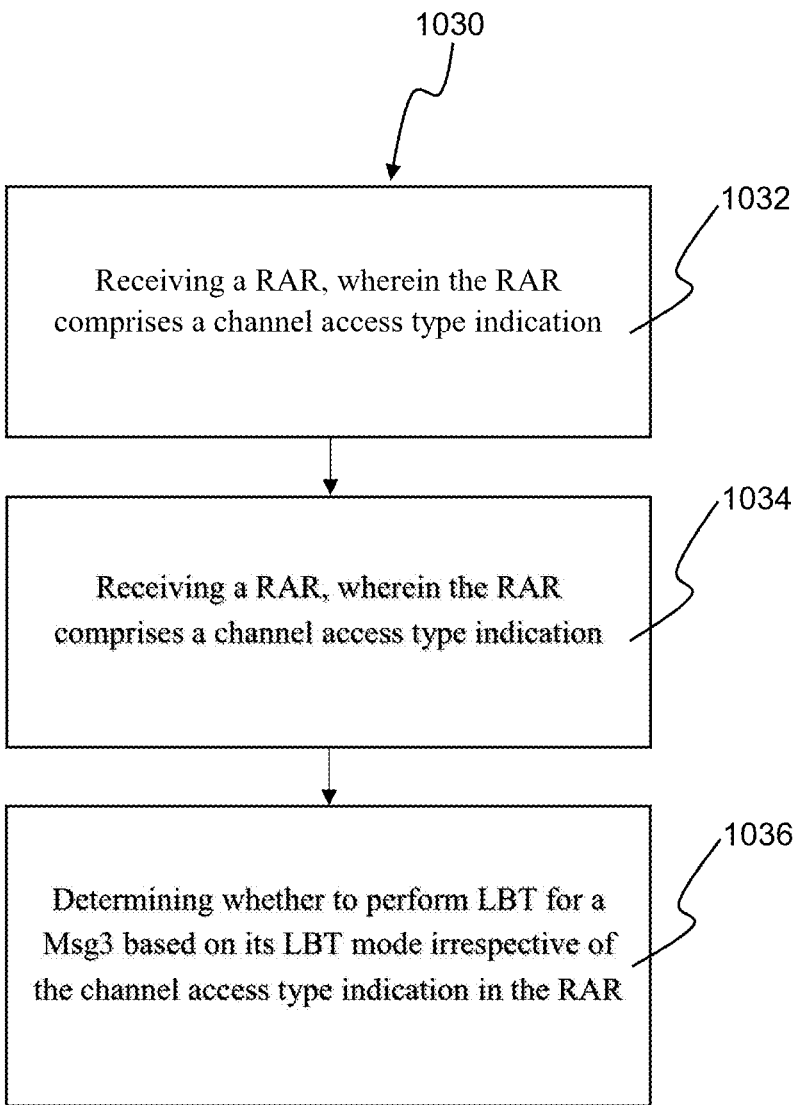
FIG. 10 is a flow diagram of a method of a UE comprising receiving a RAR, wherein the RAR comprises a channel access type indication, in accordance with embodiments of the present invention.

Referring to FIG. 10, with this and other concepts, systems, and methods of the present invention, a method 1030 for a UE in a wireless communication system comprises receiving a RAR wherein the RAR comprises a channel access type indication (step 1032), receiving a RAR, wherein the RAR comprises a channel access type indication (step 1034), and determining whether to perform LBT for a Msg3 based on its LBT mode irrespective of the channel access type indication in the RAR (step 1036).

In various embodiments, the UE determines whether to perform LBT for a Msg3 based on its LBT mode irrespective of the channel access type indication in the RAR when the UE is in No-LBT mode and/or when the UE is configured not to perform LBT.

In various embodiments, the UE does not perform LBT for the Msg3 when the UE is No-LBT mode and/or when the UE is configured not to perform LBT.

In various embodiments, the UE ignores the channel access type indication in the RAR when the UE is in No-LBT mode and/or when the UE is configured not to perform LBT.

In various embodiments, the UE does not ignore the channel access type indication in the RAR when the UE is in LBT mode and/or when the UE is configured to perform LBT.

In various embodiments, the UE determines whether to perform LBT for a Msg3 based on the channel access type indication in the RAR when the UE is in LBT mode and/or when the UE is configured to perform LBT.

In various embodiments, the UE does not perform LBT for the Msg3 if/when channel access type indication in the RAR indicates the UE not to perform LBT when the UE is in LBT mode and/or when the UE is configured to perform LBT.

In various embodiments, the UE performs LBT for the Msg3 if/when channel access type indication in the RAR indicates the UE to perform LBT when the UE is in LBT mode and/or when the UE is configured to perform LBT.

In various embodiments, the UE operates in a shared spectrum.

In various embodiments, LBT refers to a channel access scheme and/or sense a channel for performing transmission.

Referring back to FIGS. 3 and 4, in one or more embodiments from the perspective of a UE, the device 300 includes a program code 312 stored in memory 310 of the transmitter. The CPU 308 could execute program code 312 to: (i) receive a RAR, wherein the RAR comprises a channel access type indication, (ii) receive a RAR, wherein the RAR comprises a channel access type indication, and (iii) determine whether to perform LBT for a Msg3 based on its LBT mode irrespective of the channel access type indication in the RAR. Moreover, the CPU 308 can execute the program code 312 to perform all of the described actions, steps, and methods described above, below, or otherwise herein.

Figure 11:
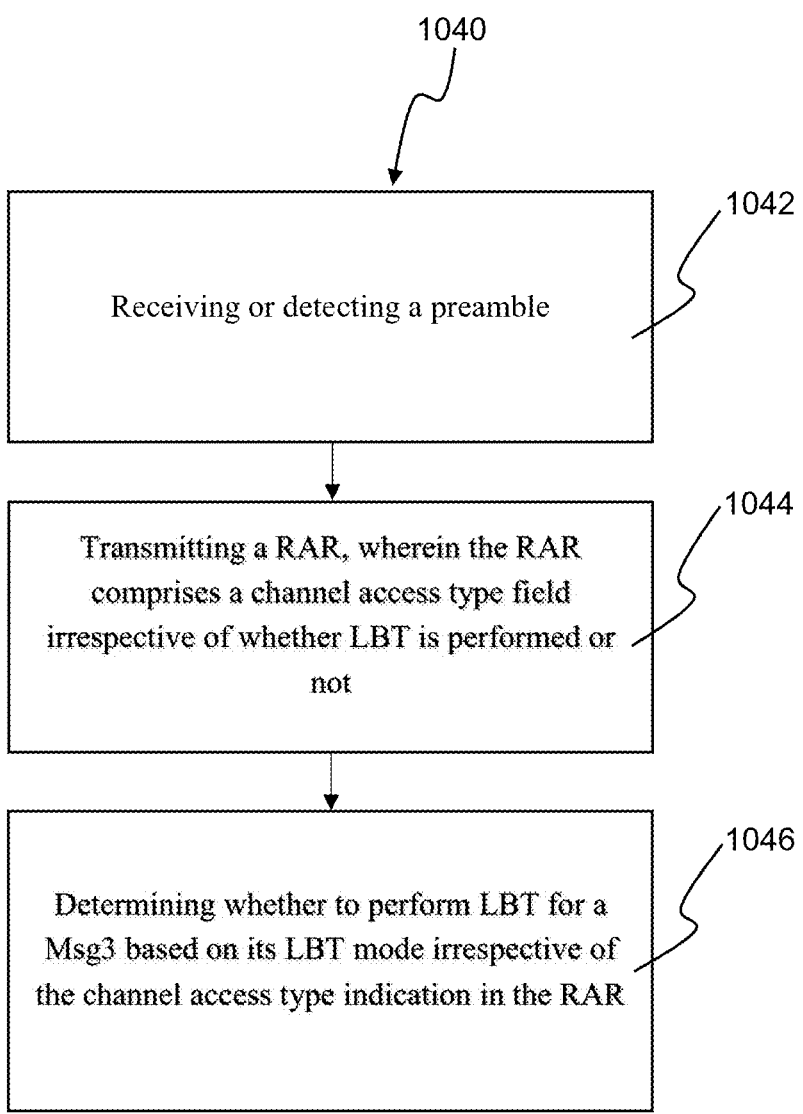
FIG. 11 is a flow diagram of a method of a base station comprising receiving or detecting a preamble and transmitting a RAR, wherein the RAR comprises a channel access type field irrespective of whether LBT is performed or not, in accordance with embodiments of the present invention.

Referring to FIG. 11, with this and other concepts, systems, and methods of the present invention, a method 1040 for a base station in a wireless communication system comprises receiving or detecting a preamble (step 1042), transmitting a RAR, wherein the RAR comprises a channel access type field irrespective of whether LBT is performed or not (step 1044), and determining whether to perform LBT for a Msg3 based on its LBT mode irrespective of the channel access type indication in the RAR (step 1036).

In various embodiments, the channel access type field indicate the UE to perform LBT for Msg 3 or not.

In various embodiments, the base station operates in a shared spectrum and/or ChannelAccessMode-r16="semistatic" is not provided.

Referring back to FIGS. 3 and 4, in one or more embodiments from the perspective of a base station, the device 300 includes a program code 312 stored in memory 310 of the transmitter. The CPU 308 could execute program code 312 to: (i) receive or detect a preamble, (ii) transmit a RAR, wherein the RAR comprises a channel access type field irrespective of whether LBT is performed or not, and (iii) determine whether to perform LBT for a Msg3 based on its LBT mode irrespective of the channel access type indication in the RAR. Moreover, the CPU 308 can execute the program code 312 to perform all of the described actions, steps, and methods described above, below, or otherwise herein.

Figure 12:
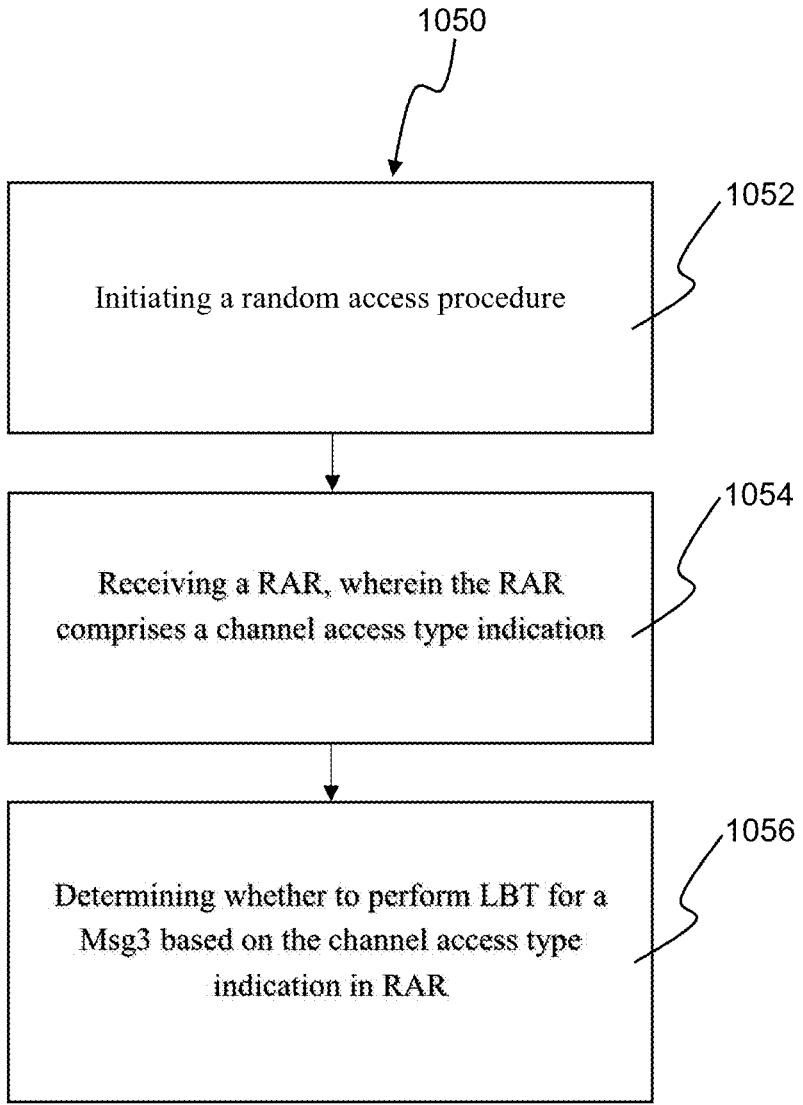
FIG. 12 is a flow diagram of a method of a UE comprising initiating a random access procedure and receiving a RAR, wherein the RAR comprises a channel access type indication, in accordance with embodiments of the present invention.

Referring to FIG. 12, with this and other concepts, systems, and methods of the present invention, a method 1050 for a UE in a wireless communication system comprises initiating a random access procedure (step 1052), receiving a RAR, wherein the RAR comprises a channel access type indication (step 1054), and determining whether to perform LBT for a Msg3 based on the channel access type indication in RAR (step 1056).

In various embodiments, the UE does not perform LBT for the Msg3 if/when the channel access type indication in the RAR indicates the UE not to perform LBT. The UE performs LBT for the Msg3 if/when channel access type indication in the RAR indicates the UE to perform LBT.

In various embodiments, the UE determines whether to perform LBT for a Msg3 based on the channel access type indication in the RAR when the UE is in LBT mode and/or when the UE is configured to perform LBT.

In various embodiments, the UE determines whether to perform LBT for a Msg3 based on the LBT mode of the UE irrespective of the channel access type indication in the RAR when the UE is in No-LBT mode and/or when the UE is configured not to perform LBT.

In various embodiments, the UE does not perform LBT for the Msg3 when the UE is in No-LBT mode and/or when the UE is configured not to perform LBT.

In various embodiments, the UE ignores the channel access type indication in the RAR when the UE is in No-LBT mode and/or when the UE is configured not to perform LBT.

In various embodiments, the UE determines how to interpret the channel access type indication based on the LBT mode of the UE.

In various embodiments, the UE operates in a shared spectrum.

In various embodiments, ChannelAccessMode-r16="semistatic" is not provided.

In various embodiments, LBT refers to a channel access scheme and/or sensing a channel for performing transmission.

Referring back to FIGS. 3 and 4, in one or more embodiments from the perspective of a base station, the device 300 includes a program code 312 stored in memory 310 of the transmitter. The CPU 308 could execute program code 312 to: (i) initiate a random access procedure, (ii) receive a RAR, wherein the RAR comprises a channel access type indication, and (iii) determine whether to perform LBT for a Msg3 based on the channel access type indication in RAR. Moreover, the CPU 308 can execute the program code 312 to perform all of the described actions, steps, and methods described above, below, or otherwise herein.

Figure 13:
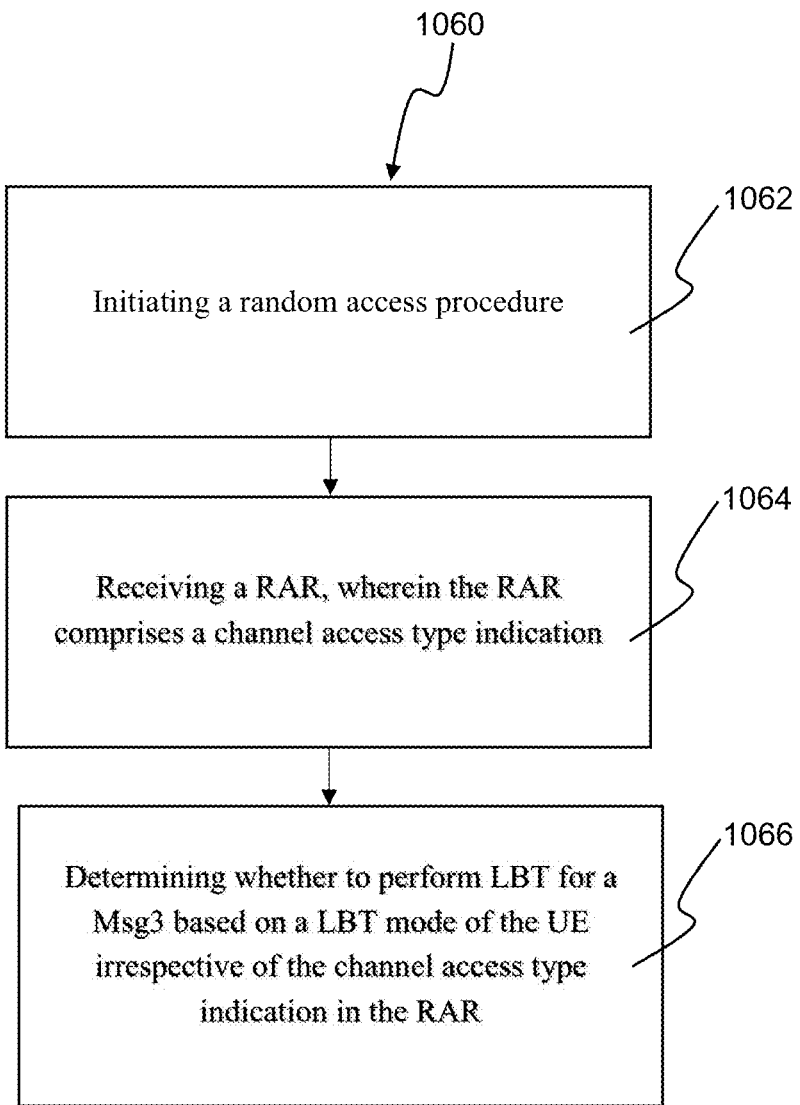
FIG. 13 is a flow diagram of a method of a UE comprising initiating a random access procedure and receiving a RAR, wherein the RAR comprises a channel access type indication, in accordance with embodiments of the present invention.

Referring to FIG. 13, with this and other concepts, systems, and methods of the present invention, a method 1060 for a UE in a wireless communication system comprises initiating a random access procedure (step 1062), receiving a RAR, wherein the RAR comprises a channel access type indication (step 1064), and determining whether to perform LBT for a Msg3 based on a LBT mode of the UE irrespective of the channel access type indication in the RAR (step 1066).

In various embodiments, the UE determines whether to perform LBT for a Msg3 based on the LBT mode of the UE irrespective of the channel access type indication in the RAR when the UE is in No-LBT mode and/or when the UE is configured not to perform LBT.

In various embodiments, the UE does not perform LBT for the Msg3 when the UE is in No-LBT mode and/or when the UE is configured not to perform LBT.

In various embodiments, the UE ignores the channel access type indication in the RAR when the UE is in No-LBT mode and/or when the UE is configured not to perform LBT.

In various embodiments, the UE does not ignore the channel access type indication in the RAR when the UE is in LBT mode and/or when the UE is configured to perform LBT.

In various embodiments, the UE operates in a shared spectrum.

In various embodiments, LBT refers to a channel access scheme and/or sensing a channel for performing transmission.

Referring back to FIGS. 3 and 4, in one or more embodiments from the perspective of a base station, the device 300 includes a program code 312 stored in memory 310 of the transmitter. The CPU 308 could execute program code 312 to: (i) initiate a random access procedure, (ii) receive a RAR, wherein the RAR comprises a channel access type indication, and (iii) determine whether to perform LBT for a Msg3 based on a LBT mode of the UE irrespective of the channel access type indication in the RAR. Moreover, the CPU 308 can execute the program code 312 to perform all of the described actions, steps, and methods described above, below, or otherwise herein.

Figure 14:
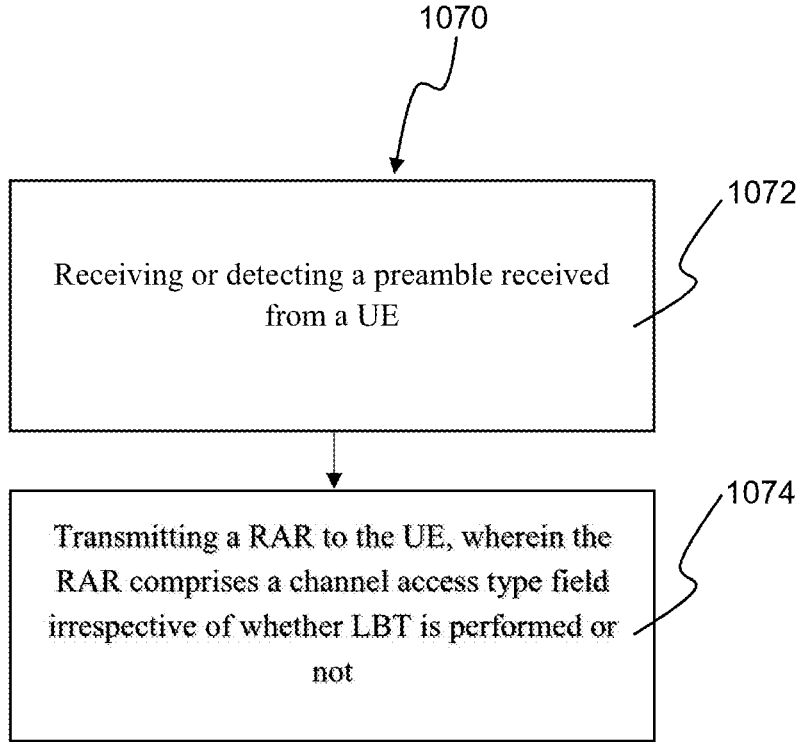
FIG. 14 is a flow diagram of a method of a base station comprising receiving or detecting a preamble received from a UE and transmitting a RAR to the UE, in accordance with embodiments of the present invention.

Referring to FIG. 14, with this and other concepts, systems, and methods of the present invention, a method 1070 for a base station in a wireless communication system comprises receiving or detecting a preamble received from a UE (step 1072), transmitting a RAR to the UE, wherein the RAR comprises a channel access type field irrespective of whether LBT is performed or not (step 1074).

In various embodiments, the channel access type field indicates the UE to perform LBT for Msg 3 or not.

In various embodiments, the UE operates in a shared spectrum and/or ChannelAccessMode-r16="semistatic" is not provided.

Referring back to FIGS. 3 and 4, in one or more embodiments from the perspective of a base station, the device 300 includes a program code 312 stored in memory 310 of the transmitter. The CPU 308 could execute program code 312 to: (i) receive or detect a preamble received from a UE, and (ii) transmitting a RAR to the UE, wherein the RAR comprises a channel access type field irrespective of whether LBT is performed or not. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
initiating a random access procedure;
receiving a random access response (RAR) from a base station, wherein the RAR comprises an indication of a channel access type and a Cyclic Prefix (CP) extension; and
not performing listen-before-talk (LBT) for a Msg3 due to the indication of the channel access type and the CP extension in the RAR indicating the UE not to perform LBT.

2. The method of claim 1, wherein the UE determines whether to perform LBT for a Msg3 based on the channel access type indication in the RAR due to the UE being in LBT mode and/or due to the UE being configured to perform LBT.

3. The method of claim 2, wherein the UE determines whether to perform LBT for a Msg3 based on the LBT mode of the UE irrespective of the channel access type indication in the RAR due to the UE being in No-LBT mode and/or due to the UE being configured not to perform LBT.

4. The method of claim 2, wherein the UE does not perform LBT for the Msg3 due to the UE being in No-LBT mode and/or due to the UE being configured not to perform LBT.

5. The method of claim 2, wherein the UE ignores the channel access type indication in the RAR due to the UE being in No-LBT mode and/or due to the UE being configured not to perform LBT.

6. The method of claim 2, wherein the UE determines how to interpret the channel access type indication based on the LBT mode of the UE.

7. The method of claim 1, wherein the UE operates in a shared spectrum.

8. The method of claim 1, wherein ChannelAccessMode-r16="semistatic" is not provided.

9. The method of claim 1, wherein LBT refers to a channel access scheme and/or sensing a channel for performing transmission.

10. The method of claim 1, wherein the UE does not perform the CP extension due to the indication of the channel access type and the CP extension in the RAR indicating the UE not to perform the CP extension.

11. The method of claim 1, wherein the indication of the channel access type and the CP extension is a ChannelAccess-CPext field.

12. A method of a User Equipment (UE), comprising:
initiating a random access procedure;
receiving a random access response (RAR) from a base station, wherein the RAR comprises an indication of a channel access type and a Cyclic Prefix (CP) extension; and
determining whether to perform listen-before-talk (LBT) for a Msg3 based on an LBT mode of the UE configured by a Radio Resource Control (RRC) configuration irrespective of the indication of the channel access type and the CP extension in the RAR.

13. The method of claim 12, wherein the UE does not perform LBT for the Msg3 due to the UE being in No-LBT mode and/or due to the UE being configured not to perform LBT.

14. The method of claim 12, wherein the UE ignores the channel access type indication in the RAR due to the UE being in No-LBT mode and/or due to the UE being configured not to perform LBT.

15. The method of claim 12, wherein the UE does not ignore the channel access type indication in the RAR due to the UE being in LBT mode and/or due to the UE being configured to perform LBT.

16. The method of claim 12, wherein the UE operates in a shared spectrum.

17. The method of claim 12, wherein LBT refers to a channel access scheme and/or sensing a channel for performing transmission.

18. The method of claim 12, wherein the UE does not perform the CP extension due to the indication of the channel access type and the CP extension in the RAR indicating the UE not to perform the CP extension.

19. A method of a base station, comprising:
receiving or detecting a preamble received from a User Equipment (UE); and
transmitting a random access response (RAR) to the UE for use in determining whether to perform listen-before-talk (LBT) for a Msg3, wherein the RAR comprises an indication of a channel access type and a Cyclic Prefix (CP) extension irrespective of whether LBT is performed or not.

20. The method of claim 19, wherein the channel access type field indicates the UE to perform LBT for Msg3 or not.

21. The method of claim 19, wherein the UE operates in a shared spectrum and/or ChannelAccessMode-r16="semistatic" is not provided.

22. The method of claim 19, wherein the base station does not perform the CP extension due to the indication of the channel access type and the CP extension in the RAR indicating not to perform the CP extension.

* * * * *